US011820493B2

(12) United States Patent
Foster et al.

(10) Patent No.: US 11,820,493 B2
(45) Date of Patent: Nov. 21, 2023

(54) LANDING SUPPORT ASSEMBLY FOR AERIAL VEHICLES

(71) Applicant: Sonin Hybrid, LLC, Atlanta, GA (US)

(72) Inventors: Curtis Asa Foster, Lawrenceville, GA (US); Raymond Samuel Trey Davenport, III, Gillsville, GA (US)

(73) Assignee: Sonin Hybrid, LLC, Atlanta, GA (US)

( * ) Notice: Subject to any disclaimer, the term of this patent is extended or adjusted under 35 U.S.C. 154(b) by 0 days.

(21) Appl. No.: 17/408,807

(22) Filed: Aug. 23, 2021

(65) Prior Publication Data

US 2022/0055740 A1 Feb. 24, 2022

Related U.S. Application Data

(60) Provisional application No. 63/069,187, filed on Aug. 24, 2020.

(51) Int. Cl.
*B64C 25/12* (2006.01)
*B64C 25/20* (2006.01)
(Continued)

(52) U.S. Cl.
CPC .............. *B64C 25/12* (2013.01); *B64C 25/20* (2013.01); *B64C 39/024* (2013.01); *B64U 10/13* (2023.01); *B64U 70/00* (2023.01)

(58) Field of Classification Search
CPC .... B64C 25/12; B64C 25/20; B64C 2201/027
See application file for complete search history.

(56) References Cited

U.S. PATENT DOCUMENTS

D648,808 S 11/2011 Seydoux et al.
D759,764 S 1/2016 Lai
(Continued)

FOREIGN PATENT DOCUMENTS

EP 008160097-0003 3/2021
WO WO-2021069156 A1 * 4/2021

OTHER PUBLICATIONS

Sonin Hybrid Recruit Drone Files at 140 MPH and Stays Airborne for 3 Hours. By Coolthings.com. dated Sep. 25, 2020. Available online as of [Apr. 20, 2023]. Retrieved from https://www.coolthings.com/sonin-hybrid-recruit-drone-140-mph-and-stays-airborne-for-3-hour-flight-time/ (Year: 2020).

*Primary Examiner* — Tye William Abell
(74) *Attorney, Agent, or Firm* — WOMBLE BOND DICKINSON (US) LLP

(57) ABSTRACT

A landing support assembly to at least partially support an aerial vehicle on a surface may include a strut extendable to a deployed state and retractable to a stowed state during flight. The strut may be configured to pivot with respect to a bracket coupled to the aerial vehicle between the deployed state and the stowed state. The landing support assembly further may include a strut actuator coupled to the strut via a linkage to cause the strut to pivot relative to the bracket. The landing support assembly also may include a foot coupled to an end of the strut remote from the bracket. The foot may be configured to change between a retracted state during flight having a first cross-sectional area and an at least partially splayed state for at least partially supporting the aerial vehicle and having a second cross-sectional area greater than the first cross-sectional area.

19 Claims, 27 Drawing Sheets

(51) Int. Cl.
  *B64C 39/02* (2023.01)
  *B64U 10/13* (2023.01)
  *B64U 70/00* (2023.01)

(56) References Cited

U.S. PATENT DOCUMENTS

| | | |
|---|---|---|
| D784,202 S | 4/2017 | Park |
| D798,961 S | 10/2017 | Li |
| D816,547 S | 5/2018 | Cui |
| D829,283 S | 5/2018 | Cai |
| D854,967 S | 7/2019 | Yu |
| D862,359 S | 10/2019 | Chen et al. |
| D875,602 S | 2/2020 | Xu et al. |
| D979,454 S | 2/2023 | Jeong et al. |
| 2016/0325834 A1 | 11/2016 | Foster |
| 2017/0253324 A1* | 9/2017 | Zhao .................. B64C 25/12 |
| 2019/0256204 A1 | 8/2019 | Sun et al. |
| 2020/0094694 A1 | 3/2020 | Zhang |
| 2020/0213517 A1 | 7/2020 | Yin et al. |
| 2020/0283141 A1 | 9/2020 | Foster |
| 2021/0114727 A1 | 4/2021 | Foster |
| 2021/0179260 A1* | 6/2021 | Baranes .................. B64C 25/12 |
| 2021/0323691 A1 | 10/2021 | Foster et al. |
| 2022/0055736 A1 | 2/2022 | Foster et al. |
| 2022/0055765 A1 | 2/2022 | Foster et al. |
| 2022/0135241 A1 | 5/2022 | Foster et al. |

* cited by examiner

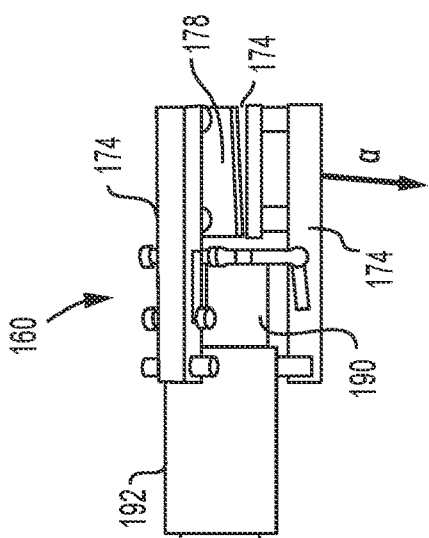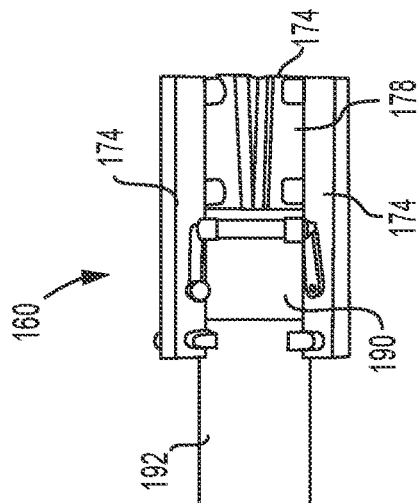
FIG. 18A
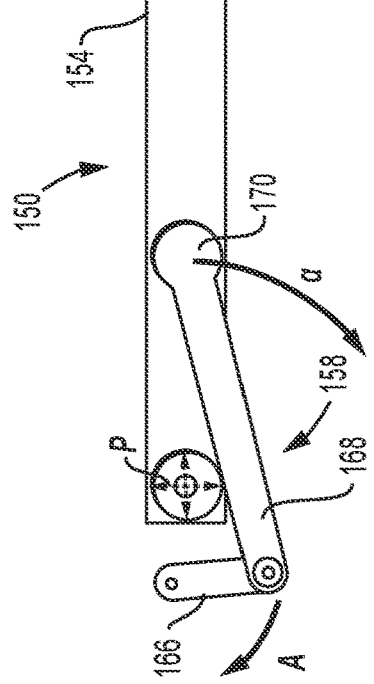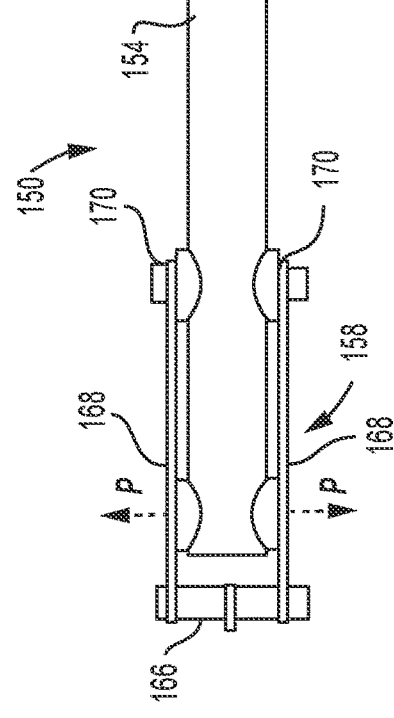
FIG. 18B

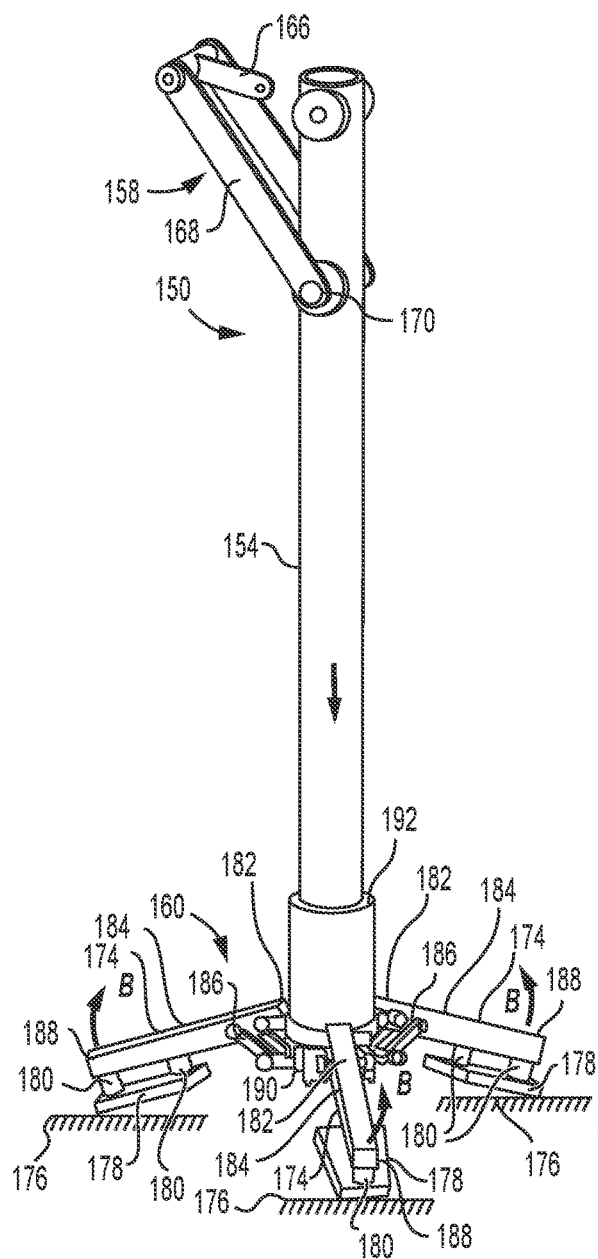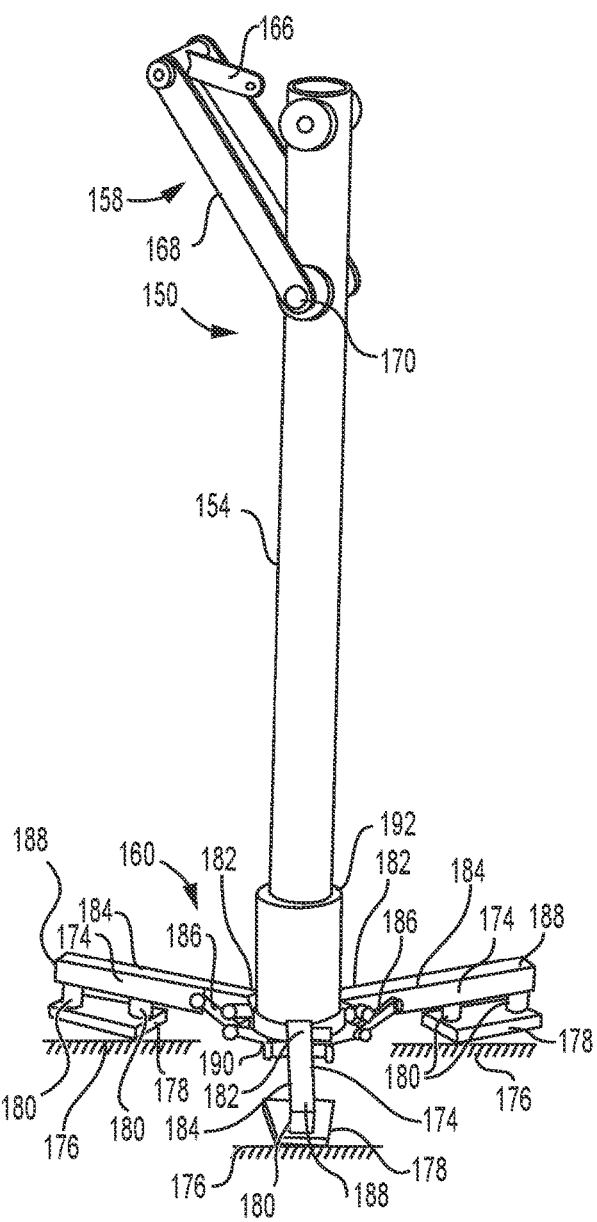
FIG. 19A
FIG. 19B

LANDING SUPPORT ASSEMBLY FOR AERIAL VEHICLES

PRIORITY CLAIM

This U.S. non-provisional patent application claims priority to and the benefit of, under 35 U.S.C. § 119(e), U.S. Provisional Application No. 63/069,187, filed Aug. 24, 2020, the disclosure of which is incorporated herein by reference in its entirety.

TECHNICAL FIELD

The present disclosure relates to aerial vehicles, and more particularly, to landing support assemblies for aerial vehicles. Other aspects also are described.

BACKGROUND

Aerial vehicles are often equipped with either fixed or retractable landing gear to facilitate landing on various surfaces, such as terrain or water. For example, some aerial vehicles have landing gear including wheels, skids, or pontoons to facilitate landing from forward flight (e.g., fixed-wing flight) on various forms of terrain, including paved-, dirt-, and/or snow-covered runways, or on water. Fixed landing gear offers reduced complexity, reduced cost, and sometimes lower weight relative to retractable landing gear. Fixed landing gear, however, generally increases drag during flight, often reducing fuel efficiency, speed, and maneuverability, and may obstruct sensors associated with the aerial vehicle. Retractable landing gear, while providing advantages of reduced drag, often increasing fuel efficiency, flight speed, and maneuverability, also increases complexity, cost, and sometimes weight, and become less reliable in soft terrain, such as soil, sand, or snow. Accordingly, it can be seen that a need may exist for providing a system enabling an aerial vehicle to take-off and land while mitigating or eliminating one or more of the foregoing and other related or unrelated, issues, and/or problems.

SUMMARY

In view of the foregoing, in one aspect, the present disclosure is directed to landing support assemblies for aerial vehicles that may provide a retractable landing support assembly to facilitate taking-off and landing and, in some embodiments, that reduces drag and volume requirements of the landing support assembly in a retracted and stowed state. The landing assemblies, in some embodiments, may provide a relatively larger footprint and contact area in a deployed state while minimizing aerodynamic drag in the stowed state. In addition, in some embodiments, the landing support assemblies may include drag reducing surfaces coupled to the aerial vehicle and/or repositionable components of the landing support assembly, enhancing the ability of the aerial vehicles to carry relatively larger payloads, achieve higher air speeds, have improved maneuverability, and/or attain flights of longer duration. In some embodiments, the landing support assemblies may be suitable for aerial vehicles that perform vertical take-offs and landings.

In some embodiments, a landing support assembly configured to at least partially support an aerial vehicle on a surface may include a strut extendable to a deployed state for at least partially supporting the aerial vehicle on the surface and retractable to a stowed state during flight of the aerial vehicle. The landing support assembly also may include a bracket coupled to the strut, such that the strut is configured to pivot with respect to the bracket between the deployed state and the stowed state. The bracket may be configured to be coupled to a chassis of the aerial vehicle. The landing support assembly further may include a strut actuator coupled to the strut via a linkage and configured to cause the strut to pivot relative to the bracket between the deployed state and the stowed state. The landing support assembly also may include a foot coupled to an end of the strut remote from the bracket. The foot, in some embodiments, may be configured to change between a retracted state during flight having a first cross-sectional area and an at least partially splayed state for at least partially supporting the aerial vehicle and having a second cross-sectional area greater than the first cross-sectional area.

Still further, in some embodiments, an aerial vehicle may include a chassis and a plurality of landing support assemblies coupled to the chassis. The plurality of landing support assemblies may be configured to support the aerial vehicle on a surface. At least one of the landing support assemblies may include a strut extendable to a deployed state for at least partially supporting the aerial vehicle on the surface and retractable to a stowed state during flight of the aerial vehicle. The aerial vehicle also may include a bracket coupled to the strut and the chassis, such that the strut is configured to pivot with respect to the bracket between the deployed state and the stowed state. The aerial vehicle further may include a strut actuator coupled to the strut via a linkage and configured to cause the strut to pivot relative to the bracket between the deployed state and the stowed state. The aerial vehicle, in some embodiments, also may include a foot coupled to an end of the strut remote from the bracket, and the foot may be configured to change between a retracted state during flight and an at least partially splayed state for at least partially supporting aerial vehicle. In some embodiments, during the retracted state the foot may have a first cross-sectional area, and while in the at least partially splayed state, the foot may have a second cross-sectional area greater than the first cross-sectional area.

In some embodiments, a method for deploying and retracting a landing support assembly configured to at least partially support an aerial vehicle on a surface may include activating a strut actuator coupled to a strut coupled to the aerial vehicle via a bracket and configured to at least partially support the aerial vehicle on the surface in a deployed state and to at least partially retract to a stowed state during flight of the aerial vehicle. Activating the strut actuator may cause the strut to extend from the retracted state to the deployed state to at least partially support the aerial vehicle on the surface. The method further may include causing a foot coupled to an end of the strut remote from the bracket to change from a retracted state during flight and having a first cross-sectional area to an at least partially splayed state for at least partially supporting the aerial vehicle and having a second cross-sectional area greater than the first cross-sectional area.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 18A is a partial side view the example landing support assembly shown in FIG. 17 in the stowed state according to a further aspect of the present disclosure.

FIG. 18B is a partial top view the example landing support assembly shown in FIG. 17 in the stowed state according to a further aspect of the present disclosure FIG. 19A is a partial perspective view of an example landing support assembly in the deployed state and having a foot in an at least partially splayed state according to a further aspect of the present disclosure.

FIG. 19B is a partial perspective view of the example landing support assembly shown in FIG. 19A in the deployed state and having a foot in a substantially fully splayed state according to a further aspect of the present disclosure.

DETAILED DESCRIPTION

The following description is provided as an enabling teaching of embodiments of this disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the disclosure and not in limitation thereof, since the scope of the disclosure is defined by the claims.

Figure 1A:
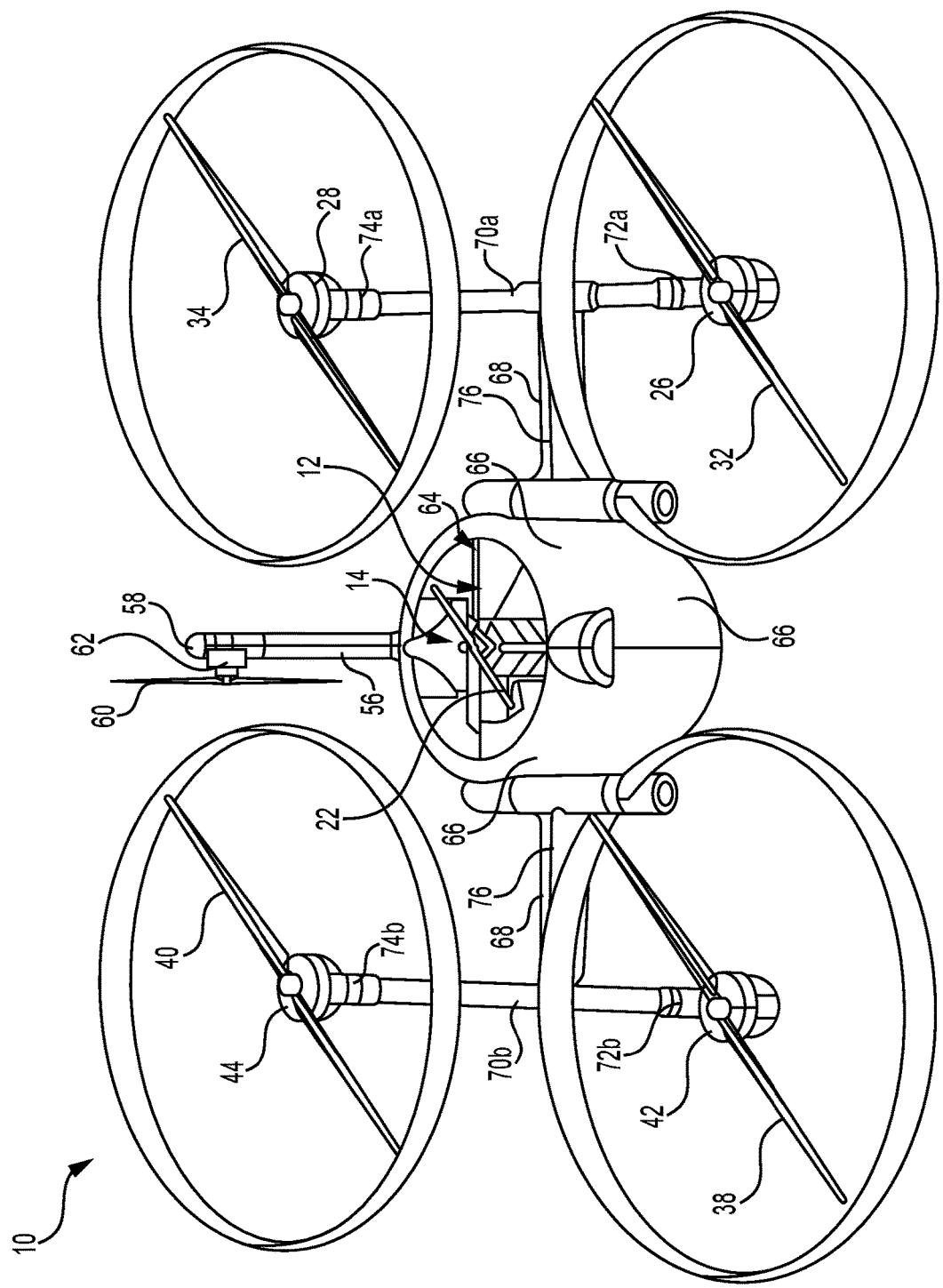
FIG. 1A is a perspective view of an example aerial vehicle according to an aspect of the present disclosure.
Figure 1B:
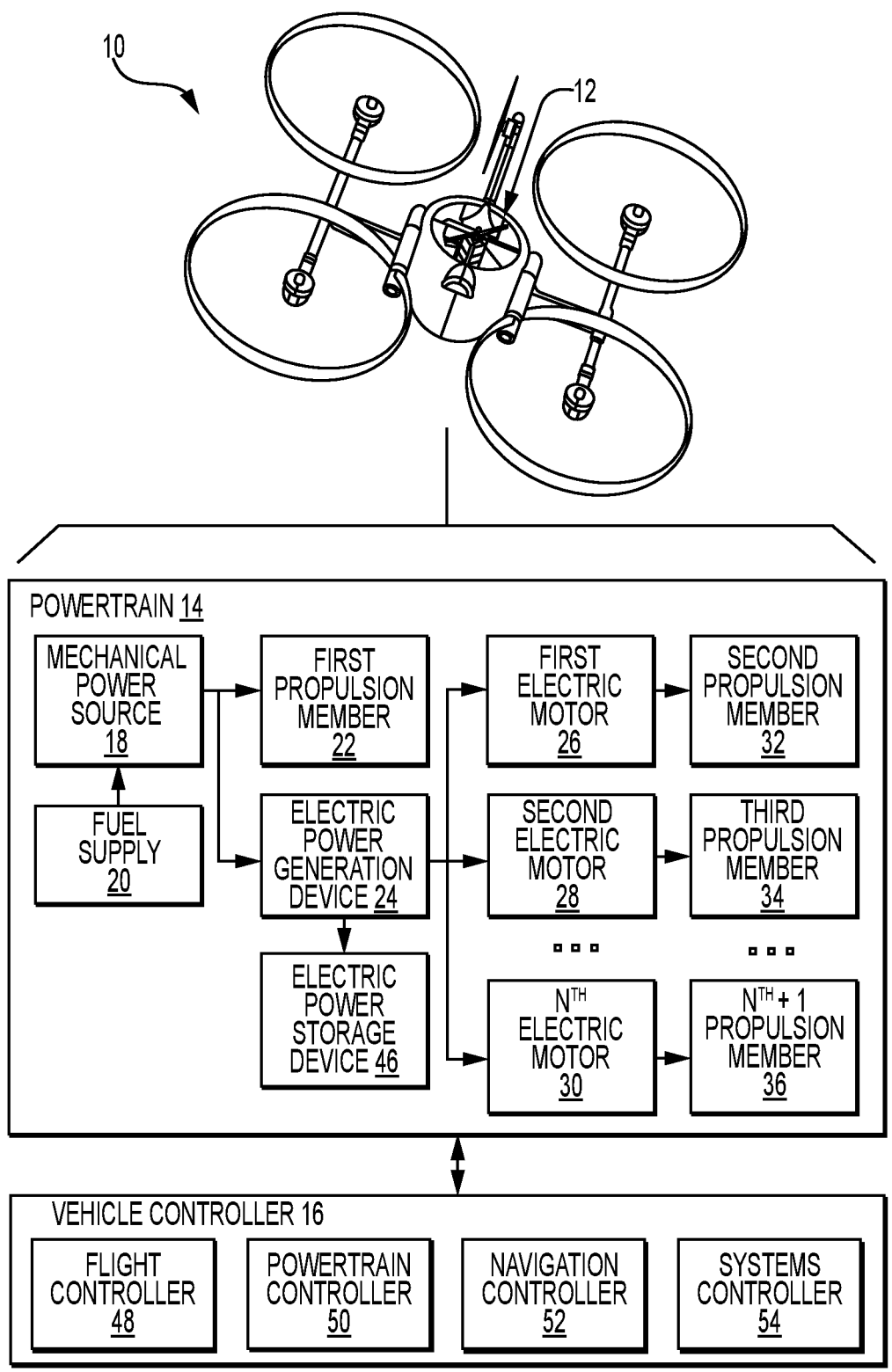
FIG. 1B is a schematic diagram of an example powertrain and an example vehicle controller according to an aspect of the present disclosure

As generally shown in FIGS. 1A and 1B, the present disclosure is directed to an aerial vehicle 10. The example aerial vehicle 10 shown in FIGS. 1A and 1B includes a chassis 12, a powertrain 14 coupled to the chassis 12 and configured to supply power for operation of the aerial vehicle 10, and a vehicle controller 16 configured to control operation of the aerial vehicle 10. As explained in more detail herein, the powertrain 14 and vehicle controller 16 are configured to supply power to the aerial vehicle 10 and control operations associated with the aerial vehicle 10, such as propulsion, maneuvering, and operation of various systems of the aerial vehicle 10.

Although the example aerial vehicle 10 shown in FIGS. 1A and 1B is shown as a multirotor aerial vehicle, the aerial vehicle 10 may be any known type of aerial vehicle. For example, the aerial vehicle 10 may be a fixed-wing aerial vehicle, a duel-rotor aerial vehicle, a vertical take-off and landing vehicle, an aerial vehicle having fixed-wing and multirotor characteristics, a hovercraft, and land-borne vehicle, a water-borne vehicle, etc. The aerial vehicle 10 may be manually controlled via an on-board pilot, and/or can be at least partially remotely controlled, semi-autonomously controlled, and/or autonomously controlled. For example, while the aerial vehicle 10 may be configured to be manually controlled/operated by an on-board pilot, if present, the aerial vehicle 10 generally will be configured to receive control signals from a remote location and be remotely controlled via a remotely located human pilot and/or a remotely located computer-based controller.

In some examples, operations of the aerial vehicle 10 may be controlled entirely by remote control or partially by remote control, i.e. in some embodiments, the aerial vehicle 10 may be configured to be operated remotely during take-off and landing maneuvers, but may be configured to operate semi- or fully-autonomously during maneuvers between take-off and landing. In other embodiments, the aerial vehicle 10 may be an unmanned aerial vehicle that is autonomously controlled, for example, via the vehicle controller 16, which may be configured to autonomously control maneuvering of the aerial vehicle 10 during take-off from a departure location, during maneuvering in-flight between the departure location and a destination location, and during landing at the destination location, for example, without the assistance of a remotely located pilot or remotely located computer-based controller, or an on-board pilot. In some embodiments, the aerial vehicle 10 may be or include a multi-rotor drone, such as drones defined by or similar to Federal Aviation Administration Part 107 or other similar drones.

As shown in FIGS. 1A and 1B, in one embodiment, the example powertrain 14 includes a mechanical power source 16 coupled to the chassis 12 and configured to supply mechanical power to the aerial vehicle 10 for operation. The powertrain 14 shown in FIG. 1B further includes a fuel supply 20, which may include a reservoir for containing fuel and a fuel conduit for providing flow communication between the fuel supply 20 and the mechanical power source 18 for operation of the mechanical power source.

The mechanical power source 18 may be any type of motor, engine, or other driving device that operates by converting energy of the fuel in the fuel supply 20 into a mechanical energy output. For example, the mechanical power source 18 may include any type of internal combustion engine configured to convert any type of fuel into mechanical power, such as a reciprocating-piston engine, a two-stroke engine, a three-stroke engine, a four-stroke engine, a five-stroke engine, a six-stroke engine, a gas turbine engine, a rotary engine, a compression-ignition engine, a spark-ignition engine, a homogeneous-charge compression ignition engine, and/or any other known type of engine. The fuel supply 20 may include any type of fuel that may be converted into mechanical power, such as gasoline, gasohol, ethanol, diesel fuel, bio-diesel fuel, aviation fuel, jet fuel, hydrogen, liquefied-natural gas, propane, nuclear fuel, and/or any other known type of fuel convertible into mechanical power by the mechanical power source 18.

In at least some examples, the mechanical power source 18 and the fuel supply 20 may be selected and/or configured to provide a relatively higher power density as compared a combination of batteries and electric motors. Although only a single mechanical power source 18 is shown in FIG. 1B, the powertrain 14 may include more than one mechanical power source, and the multiple mechanical power sources may be mechanical power sources of the same type or of different types, and/or may be configured to operate using the same type of fuel or different types of fuel.

As shown in FIGS. 1A and 1B, the example powertrain 14 also includes a first propulsion member 22 coupled to the chassis 12 and the mechanical power source 18. The first propulsion member 22 is configured to convert at least a portion of the mechanical power supplied by the mechanical power source 18 into a thrust force. The thrust force may be used to assist the aerial vehicle 10 during take-off, during flight, during maneuvering, and/or during landing. The first propulsion member 22 may include any type of device configured to convert at least a portion of mechanical power supplied by the mechanical power source 18 into a thrust force capable of assisting flight of the aerial vehicle 10. For example, the first propulsion device 22 may include a propeller, an open rotor, and/or a ducted fan mechanically coupled to the mechanical power source 18, for example, via a rotating shaft, and the first propulsion device 22 may be configured to convert power from the rotating shaft into a thrust force.

In the example shown in FIG. 1B, the powertrain 14 also includes an electric power generation device 24 coupled to the chassis 12 and the mechanical power source 18 and configured to convert at least a portion of mechanical power supplied by the mechanical power source 18 into electrical power. For example, the electric power generation device 24 may include a generator mechanically coupled to the mechanical power source 18, for example, via a rotating shaft, and the electrical power generation device 24 may be configured to convert power from the rotating shaft into electrical power for use by other components and devices of the aerial vehicle 10, as explained herein. Although only a single electric power generation device 24 is shown in FIG. 1B, the powertrain 14 may include more than one electric power generation device, and the multiple electric power generation devices may be of the same type or of different types, such as solar-powered and/or wind-powered electric power generation devices.

The example powertrain 14 shown in FIG. 1B also includes one or more electric motors coupled to the chassis 12 and the electric power generation device 24 and configured to convert electrical power into rotational power. The electric power generation device 24 may include one or more electric motors, for example, including a first electric motor 26 and a second electric motor 28 through an $n^{th}$ electric motor 30, with one or more of the first electric motor 26 and the second electric motor 28 through the nth electric motor 30 being coupled to at least one propulsion member. For example, as shown in FIGS. 1A and 1B, the first electric motor 26 may be coupled to a second propulsion member 32 via a drive shaft, the second electric motor 28 may be coupled to a third propulsion device 34 via a drive shaft, and the $n^{th}$ electric motor 30 may be coupled to an $n^{th}+1$ propulsion member 36 via a drive shaft.

In some examples, one or more of the second propulsion member 32 or the third propulsion member 34 through the $n^{th}+1$ propulsion member 36 may be configured to convert at least a portion of the mechanical power supplied by the first electric motor 26 and the second electric motor 28 through the nth electric motor 30 into a respective thrust force. The thrust force may be used to assist the aerial vehicle 10 during take-off, during flight, during maneuvering, and/or during landing. The one or more propulsion members 32, 34, and 36 further may include any type of device configured to convert at least a portion of mechanical power supplied by the respective electric motors into a thrust force capable of assisting flight of the aerial vehicle 10. For example, one or more of the propulsion members 32, 34, and 36 may include a propeller, an open rotor, and/or a ducted fan mechanically coupled to the respective electric motors and configured to generate a thrust force when driven or rotated by their respective electric motors.

The example aerial vehicle 10 shown in FIGS. 1A and 1B includes the first propulsion member 22 coupled to the mechanical power source 18, as well as four propulsion members including the second propulsion member 32, the third propulsion member 34, a fourth propulsion member 38, and a fifth propulsion member 40 coupled respectively to the first electric motor 26, the second electric motor 28, a third electric motor 42, and a fourth electric motor 44. As explained herein, the mechanical power source 18 and the first through fourth electric motors 26, 28, 42, and 44 may be operated in a coordinated manner to cause the aerial vehicle 10 to take-off, maneuver during flight, and land.

As shown in FIG. 1B, the example aerial vehicle 10 also includes the vehicle controller 16, which is in communication with the mechanical power source 18, the electric power generation device 24, and/or one or more of the electric motors 26, 28, 42, or 44. In some embodiments, the vehicle controller 16 may be configured to at least partially control aerial maneuvering of the aerial vehicle 10, such as during selected operations of the aerial vehicle 10, including, but not limited to control of the aerial vehicle 10 or aspects of its operation during take-off, maneuvering during flight, and during landing, by controlling operation of the mechanical power source 18, the electric power generation device 24, and/or one or more of the electric motors 26, 28, 42, or 44.

The vehicle controller 16 may be configured to cause supply of a first portion of the mechanical power from the mechanical power source 18 to the first propulsion member 22 and supply of a second portion of the mechanical power from the mechanical power source 18 to the electric power generation device 24 based at least in part on at least one characteristic associated with maneuvering of the aerial vehicle 10. For example, the vehicle controller 16 may be configured to split mechanical power supplied by the mechanical power source 18 between the first propulsion member 22 and the electric power generation device 24, depending at least in part on the operation of the aerial vehicle 10 at any given moment and/or in an anticipation of future maneuvering.

In some embodiments, such as shown in FIG. 1B, the powertrain 14 may also include an electric power storage device 46 configured to store electric power generated by the electric power generation device 24 for use by any devices of the aerial vehicle 10 that use electric power for operation. The electric power storage device 46 may be any device configured to store electric power, such as one or more batteries of any known type. Electric power stored in the electric power storage device 46 may be used to supply electric power to one of more the electric motors to substitute or supplement electric power supplied by the electric power generation device 24, depending on, for example, the level of charge of the electric power storage device 46 and/or the instantaneous and/or anticipated future electric power requirements of the aerial vehicle 10 for operation and/or maneuvering.

The vehicle controller 16 may also be configured to determine a ratio of the portion of the mechanical power supplied for powering the first propulsion member 22 to the mechanical power supplied to the electric power generation device 24 based at least in part on whether the aerial vehicle 10 lifting off a surface on which the aerial vehicle 10 is supported (e.g., during take-off), hovering while remaining stationary relative to the surface, changing altitude (e.g., ascending or descending), traveling at speed in a given direction, turning, changing pitch, changing roll, and/or changing yaw.

For example, if the aerial vehicle 10 is taking off, a relatively greater portion of the mechanical power supplied by the mechanical power source 18 may be supplied to the first propulsion member 22, as compared to the portion of the mechanical power supplied to the electric power generation device 24. In some circumstances, this may cause the first propulsion member 22 to provide a relatively greater portion of the lift necessary for take-off. If the aerial vehicle 10 has already achieved a desired altitude and is performing a maneuver, such as turning, changing pitch, changing roll, and/or changing yaw, a relatively greater portion of the mechanical power may be supplied to the electric power generation device 24, so that the electric motors and corresponding propulsion members may be used to perform the desired maneuver.

In some aspects, the electric motors may be capable of more quickly responding to control inputs for maneuvering the aerial vehicle 10 due, for example, to an ability of electric motors to more quickly change output speed relative to many types of mechanical power sources, such as some internal combustion engines. Thus, the first propulsion member 22 coupled to the mechanical power source 18 may receive a relatively greater portion of the mechanical power supply during thrust-intensive maneuvers, such as during take-off and while traveling at speed in a given direction. The electric power generation device 24 may also receive a relatively greater portion of the mechanical power supply to supply relatively more electric power to electric motors coupled to the respective propulsion members during maneuvers that are relatively less thrust-intensive, such as during turning, changing pitch, changing roll, and/or changing yaw of the aerial vehicle 10.

As shown in FIG. 1B, the vehicle controller 16 includes a flight controller 48 configured to control maneuvering of the aerial vehicle 10. The vehicle controller 16 may also include a powertrain controller 50 configured to control operation of the mechanical power source 18, the electric power generation device 24, the electric power storage device 46, and/or the flow of power supplied to other powered systems of the aerial vehicle 10, such as the controllers, computing devices, lights, actuators, communications devices, sensors, etc., associated with the aerial vehicle 10. The vehicle controller 16 may also include a navigation controller 52 configured to receive signals indicative of a location, heading, and/or orientation of the aerial vehicle 10 to assist the flight controller 48 with navigating between a flight departure location and a flight destination. As shown in FIG. 1B, some embodiments of the vehicle controller 16 may also include a system controller 54 configured to control operation of various systems of the aerial vehicle 10, such as operation of non-flight related systems, lights, communications devices, payload deposit actuators, etc.

In some operations, the vehicle controller 16 may be configured to control the supply of mechanical power to the first propulsion member 22 and/or the electric power generation device 24 based at least in part on one or more status factors associated with the aerial vehicle 10. The status factors may include, without limitation, an amount of fuel in the fuel supply 20 carried by the aerial vehicle 10, the weight of the aerial vehicle 10, the payload carried by the aerial vehicle 10, the weight distribution of the aerial vehicle 10, a level of charge of the electric power storage device 46 carried by the aerial vehicle 10, a temperature associated with the mechanical power source 10, an altitude of the aerial vehicle 10, and/or the efficiency of any subsystem or overall operation of the aerial vehicle 10.

In the embodiment shown in FIG. 1A, the aerial vehicle 10 includes a longitudinally extending tail section 56 coupled to a rear portion of the chassis 12 and extending rearward relative to the aerial vehicle 10. The remote end 58 of the tail section 56 includes a rotor 60 and a fifth electric motor 62, which may correspond to one of the electric motors of the powertrain 14, as shown in FIG. 1B. The fifth electric motor 62 may be configured to drive the rotor 60 to at least partially control yaw of the aerial vehicle 10. For example, the rotor 60 may be any type of propulsion device configured to convert power supplied by the fifth electric motor 62 into a thrust force. The vehicle controller 16 (e.g., the flight controller 48) further may be configured to at least partially control maneuvering of the aerial vehicle 10 via operation of the rotor 60, for example, to control yaw of the aerial vehicle 10 during maneuvering.

In some examples, one or more of the first propulsion member 22, the second propulsion member 32, the third propulsion member 34, the fourth propulsion member 38, the fifth propulsion member 40, or the rotor 60 may include one or more propellers, and the one or more propellers may be configured to have adjustable pitch. This may enable tailoring of the amount of thrust provided by one or more of the propulsion members independent of, or in combination with, the speed of rotation of the respective propulsion member, which may enhance control and maneuvering of the aerial vehicle 10 and/or the efficiency of operation of the powertrain 14.

As shown in FIG. 1A, the chassis 12 of some examples of the aerial vehicle 10 may include a structural core 64 configured to support the powertrain 14 and provide a support structure to which other portions of the aerial vehicle 10 are attached. For example, the tail section 56 may be coupled to a rear portion of the core 64. As also shown in FIG. 1A, cover portions 66 may be coupled to the core 64 in part to protect components of the aerial vehicle 10, such as the vehicle controller 16 and various components of the powertrain 14, including the electric power generation device 24 and the electric power storage device 46, as well as other components of the aerial vehicle 10 that may be susceptible to damage by environmental elements. The cover portions 66 may at least partially provide aerodynamic characteristics of the aerial vehicle 10, such as reduced aerodynamic drag and/or additional lift during forward flight.

The example aerial vehicle 10 shown in FIG. 1A also includes a pair of lateral supports 68, each coupled to opposite lateral sides of the core 64 of the chassis 12. Respective remote ends of the example lateral supports 68 are each coupled to an intermediate portion of a respective longitudinal rotor beam 70a and 70b configured to support one or more electric motor and propulsion device pairs. For example, as shown in FIG. 1A, a first of one of the lateral rotor beams 70a supports at a forward end 72a, the first electric motor 28 and second propulsion member 32 pair, and at a rearward end 74a, the second electric motor 28 and third propulsion member 34 pair. A second one of the lateral rotor beams 70b supports at a forward end 72b, the third electric motor 42 and fourth propulsion member 38 pair, and at a rearward end 74b, the fourth electric motor 44 and fifth propulsion member 40 pair.

In some embodiments, the lateral supports 68 and the rotor beams 70a and 70b include electric power links to supply electrical power to the first through fourth electric motors 26, 28, 42, and 44 from one or more of the electric power generation device 24, the electric power storage device 46, or the powertrain controller 50. The lateral supports 68 and the rotor beams 70a and 70b may further include communications links configured to transmit/supply control signals for controlled operation of the first through fourth electric motors 26, 28, 42, and 44 from the flight controller 48 and/or the powertrain controller 50, and provide feedback, such as power levels, position data, and other operational information to the vehicle controller 16. The communications links may be hard-wired and/or wireless.

The tail section 56 may also include an electrical power link to supply electric power to the fifth electric motor 62 for operation of the rotor 60 from one or more of the electric power generation device 24, the electric power storage device 46, or the powertrain controller 50. In addition, the tail section 56 may include a communications link to supply control signals for controlled operation of the fifth electric motor 62 coupled to the rotor 60 from the flight controller 48 and/or the powertrain controller 50, and which may receive/transmit feedback, such as power levels, position data, and other operational information to the vehicle controller. The communications link to the fifth electric motor 62 may be hard-wired and/or wireless.

As shown in FIG. 1A, each of the lateral supports 68 may support a respective control surface 76 configured to assist with control of maneuvering of the aerial vehicle 10, for example, during forward flight in a manner at least similar to the control surfaces of a fixed-wing aircraft. The lateral supports 68 may each include (or house) one or more actuators 78 (see, e.g., FIGS. 3 and 6) configured to control orientation of the control surfaces 76, either together or independently of one another. The flight controller 48 may be configured to communicate control signals to one or more of the actuators 78 via hard-wired and/or wireless communication links. In some embodiments, the actuators 78 may be electric actuators (e.g., motors and/or linear actuators) configured to be activated via electrical power supplied by the powertrain 14, for example, by one or more of the electric power generation device 24, the electric power storage device 46, or the powertrain controller 14. Other types of actuators are contemplated, such as hydraulic actuators and/or mechanical actuators.

Figure 2:
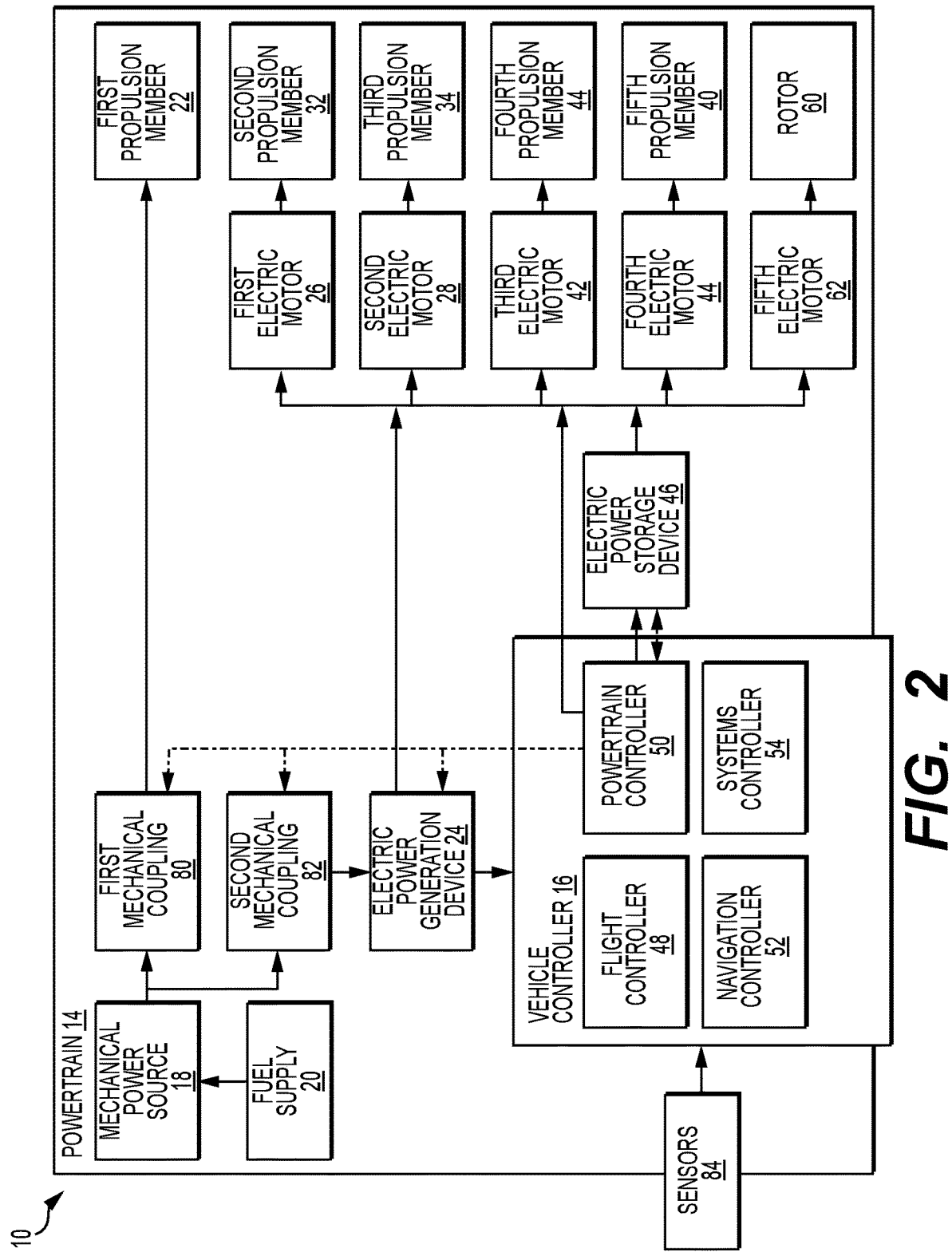
FIG. 2 shows a schematic diagram of a powertrain and a vehicle controller for a vehicle according to another aspect of the present disclosure.

FIG. 2 shows a schematic diagram of an example powertrain 14 and an example vehicle controller 16. As shown in FIG. 2, the example powertrain 14 includes a first mechanical coupling 80 coupling the mechanical power source 18 and the first propulsion member 22 to one another. In addition, the example powertrain 14 also includes a second mechanical coupling 82 coupling the mechanical power source 18 and the electric power generation device 24 to one another.

The first mechanical coupling 80 and/or the second mechanical coupling 82 may generally be configured to facilitate alteration or modification of the mechanical power transferred from the mechanical power source 18 to the first propulsion member 22 and the portion of the mechanical power from the mechanical power source 18 to the electric power generation device 24. For example, the first mechanical coupling 80 and/or the second mechanical coupling 82 may be configured to alter the ratio of the portion of the mechanical power transferred to the first propulsion member 22 to the portion of the mechanical power transferred to the electric power generation device 24. The vehicle controller 16 (e.g., the powertrain controller 50) may also be configured to communicate control signals to the first mechanical coupling 80 and/or the second mechanical coupling 82 to control the ratio based on, for example, one or more characteristics associated with maneuvering of the aerial vehicle 10 and/or one or more status factors associated with the aerial vehicle 10.

In some embodiments, the first mechanical coupling 80 and/or the second mechanical coupling 82 may include a clutch and/or a transmission configured to transfer torque from the mechanical power source 18 to the first propulsion member 22 and/or the electric power generation device 24, respectively. The first mechanical coupling 80 and/or the second mechanical coupling 82 may also include an electrically actuated clutch, a pneumatically actuated clutch, or a hydraulically actuated clutch.

In addition, or alternatively, the first mechanical coupling 80 may include a transmission configured to configured to convert an input speed into an output speed, and control a ratio of the rotational speed of the mechanical power source 18 to the rotational speed of the first propulsion member 22. This may serve to help improve the efficiency, control, and/or operation of the first propulsion member 22 and/or the mechanical power source 18, for example, because the mechanical power source 18 and the first propulsion member 22 may need to be operated at rotational speeds different from one another to achieve the desired flight and maneuvering of the aerial vehicle 10.

The second mechanical coupling 82 may also include a transmission configured to convert an input speed into an output speed, and control a ratio of the rotational speed of the mechanical power source 18 to the rotational speed of the electric power generation device 24. This may serve to help improve the efficiency, control, and/or operation of the electric power generation device 24 and/or the mechanical power source 18, for example, because the mechanical power source 18 and the electric power generation device 24 may need to be operated at rotational speeds different from one another to achieve the desired electric power generation for the powertrain 14 and operation of the aerial vehicle 10. In examples including one or more transmissions, the one or more transmissions may include at least one of a continuously variable transmission, a planetary gear train, or a belt drive.

The mechanical power source 18 may further include a first drive shaft coupling the mechanical power source 18 to the first propulsion member 22, and a second drive shaft coupling the mechanical power source 18 to the electric power generation device 24. The first drive shaft may extend in a first direction relative to the mechanical power source 18, and the second drive shaft extends in a second direction relative to the mechanical power source 18 opposite the first direction. For example, the first drive shaft may extend from a first end of the mechanical power source 18, e.g., upward, and the second drive shaft may extend from a second opposite end of the mechanical power source 18, e.g., downward. The first drive shaft and the second drive shaft may be common or coupled to one another.

In some embodiments, the first drive shaft or the second drive shaft may be hollow, and the other of the first drive shaft or the second drive shaft extends at least partially through the hollow drive shaft. In some such examples, the first propulsion member 22 and the electric power generation device 24 may be on the same end of the mechanical power source 18, for example, such that the electric power generation device 24 is located between the mechanical power source 18 and the first propulsion member 22. In some examples, the powertrain 14 may also include power take-off shaft coupled to the mechanical power source 18 and configured to couple the mechanical power 18 source to one or more of the first propulsion member 22, the second propulsion member 32, or another device or component of the aerial vehicle 10 that is operable via mechanical power supplied by the mechanical power source 18.

As shown in FIG. 2, the aerial vehicle 10 may include one or more sensors 84 configured to generate at least one signal indicative of at least one of a location of the aerial vehicle 10, motion of the aerial vehicle 10 (e.g., heading, speed, and/or orientation of the aerial vehicle 10), at least one object in an environment surrounding the aerial vehicle 10, the weight of the aerial vehicle 10, the weight distribution of the aerial vehicle 10, the weight of a payload carried by the aerial vehicle 10, an amount of fuel in the fuel supply 20 carried by the aerial vehicle 10, or any other condition related to the aerial vehicle 10.

The vehicle controller 16 (e.g., the powertrain controller 50) may be configured to receive one or more signals from the sensors 84 and cause supply of a portion of the mechanical power to the first propulsion member 22 and/or supply of a portion of the mechanical power to the electric power generation device 24 based at least in part on the signals. For example, a ratio of the mechanical power supplied to the first propulsion member 22 to the mechanical power supplied to the electric power generation device 24 may be altered based at least in part on one or more of the signals. In some examples, the vehicle controller 16 (e.g., the flight controller 48) may be configured to receive one or more of the signals and at least partially control aerial maneuvering of the aerial vehicle 10 based at least in part on the one or more signals.

In some examples, the vehicle controller 16 (e.g., the navigation controller 52) may be configured to receive the one or more signals from the sensors 84 and cause the aerial vehicle 10 to take-off, maneuver to a destination, and/or land based at least in part on the one or more signals. For example, the sensors 84 may include a global positioning system (GPS) receiver, accelerometers, gyroscopes, and/or inertial measurement units configured to generate signals received by the navigation controller 52, which may determine the position, velocity, heading, and/or orientation of the aerial vehicle 10, and communicate with the flight controller 48, so that the flight controller 48 can communicate with the powertrain 14 to cause the aerial vehicle 10 to maneuver to the destination.

In some further examples, the sensors 84 may include one or more imagers, one or more light detection and ranging (LIDAR) sensors, one or more radio detection and ranging (RADAR) sensors, and/or one or more sound navigation and ranging (SONAR) sensors, or the like configured to detect objects in the environment surrounding the aerial vehicle 10. The vehicle controller 16 (e.g., the navigation controller 52) may be configured to receive one or more such signals and cause the aerial vehicle 10 to take-off, maneuver to a destination, avoid obstacles, and/or land based at least in part on the one or more signals from the sensors 84.

Figure 3:
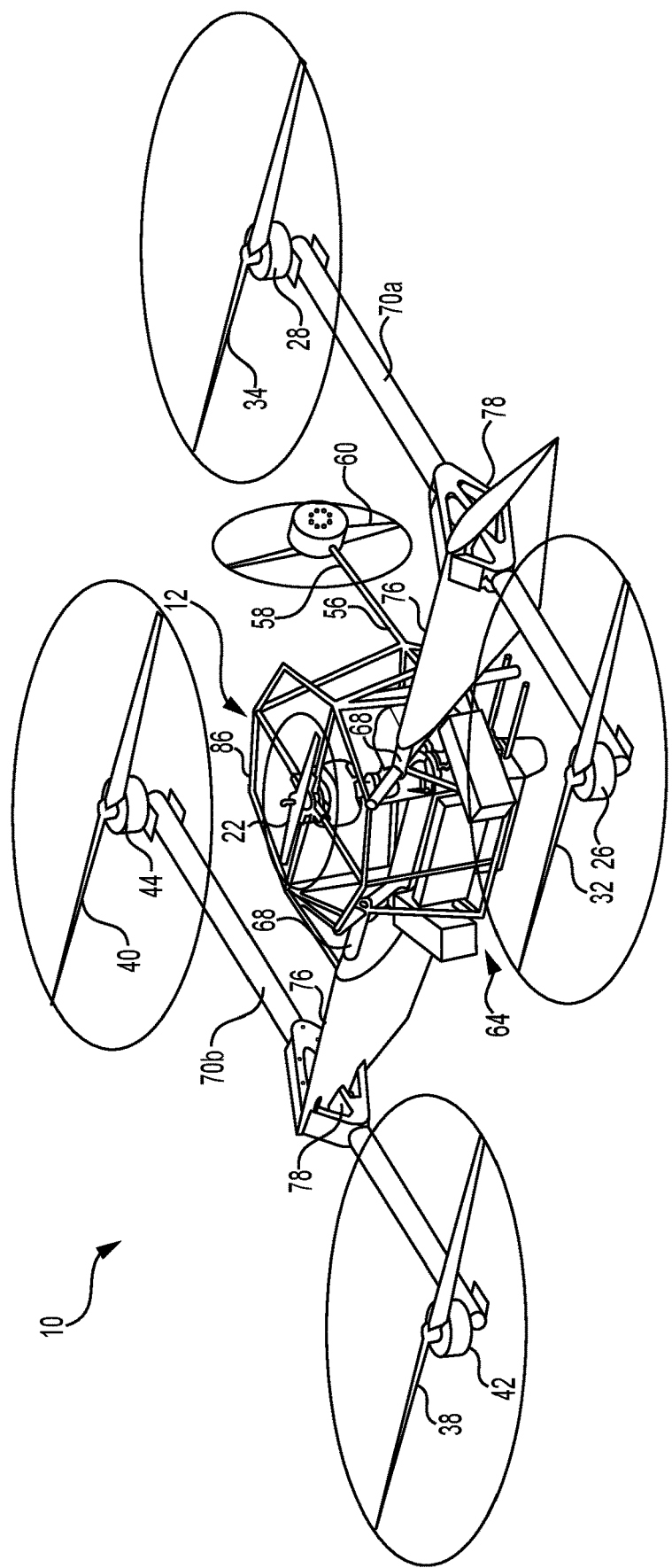
FIG. 3 shows an overhead perspective view of an aerial vehicle with cover portions removed to reveal an example chassis of the aerial vehicle according to a further aspect of the present disclosure.

FIG. 3 shows an overhead perspective view of an example aerial vehicle 10 with the cover portions 66 (see FIG. 1A) removed to reveal an example chassis 12 of the aerial vehicle 10 according to a further aspect of the present disclosure. As shown in FIG. 3, the chassis 12 includes a plurality of frame members 86 forming the core 64 of the chassis 12. In some examples, the chassis 12 may include a monocoque instead of, or in addition to, the frame members 86. In the example shown, the lateral supports 68 are coupled to frame members 86 of the chassis 12 and extend laterally away from the core 64, each supporting a respective control surface 76. The remote ends of the lateral supports 68 are coupled to the respective rotor beams 70a and 70b, and the actuators 78 configured to control operation of the control surfaces 76 are located at the remote ends of the lateral supports 68. In some examples, the actuators 78 may be located at the in-board ends of the lateral supports 68 and/or between the remote ends and the in-board ends of the lateral supports 68.

In some examples, one or more of the propulsion members may be coupled to the aerial vehicle 10, such that the orientation of the one or more propulsion members may be altered with respect to the chassis 12. This configuration may provide greater control of operation of the aerial vehicle 10, for example, by facilitating a change in direction of the thrust force of the respective propulsion member. In such examples, the aerial vehicle 10 may include actuators configured to alter the orientation of the propulsion members, and the vehicle controller 16 (e.g., the powertrain controller 50 and/or the flight controller 52) may be configured to cause these actuators to alter the orientation of the propulsion members to assist with achieving desired maneuvers.

In addition, one or more movable vanes may be associated with one or more of the propulsion members. The one or more movable vanes may be configured to affect the direction of the thrust force associated with operation of the propulsion members. Such examples may provide greater control of operation of the aerial vehicle 10, for example, by facilitating a change in direction of the thrust force of the propulsion member. In such examples, the aerial vehicle 10 may include actuators configured to alter the orientation movable vanes, and the vehicle controller 16 (e.g., the powertrain controller 50 and/or the flight controller 52) may be configured to cause the movable vane actuators to alter the orientation of the movable vanes to assist with achieving desired maneuvers.

Figure 4:
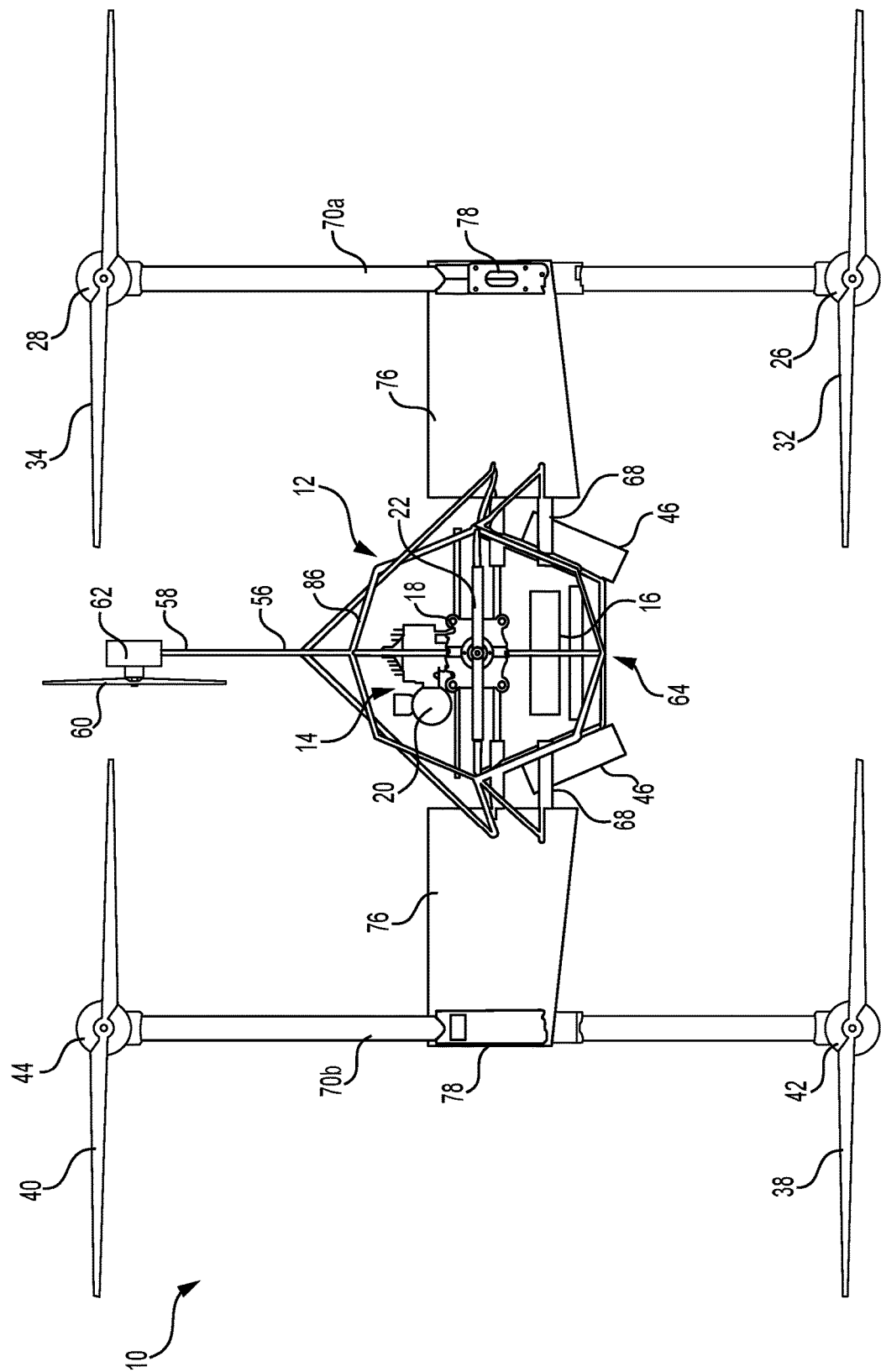
FIG. 4 shows a top view of the aerial vehicle of FIG. 3 with cover portions removed to reveal the chassis and an example arrangement of propulsion members.

FIG. 4 shows a top view of the example aerial vehicle 10 shown in FIG. 3 with the cover portions 66 removed to reveal the example chassis 12 of the aerial vehicle 10. As shown in the top view, for some examples of the aerial vehicle 10, some of the propulsion members are located at corners of a polygon as viewed from above the aerial vehicle 10. For example, as shown in FIG. 4, the second propulsion member 32, the third propulsion member 34, the fourth propulsion member 38, and the fifth propulsion member 40 are located at the corners of a rectangle as viewed from above the aerial vehicle 10. Other numbers of propulsion members and/or forms of polygon are contemplated. For example, the aerial vehicle 10 may include fewer or more than five propulsion members, and the propulsion members may not be arranged in a polygon. For example, some or all of the propulsion members may be arranged along a line (either straight or curved) as viewed from about the aerial vehicle 10, and in some examples, some or all of the propulsion members may be arranged in a cross (e.g., in two intersecting lines) as viewed from above the aerial vehicle 10.

Figure 5:
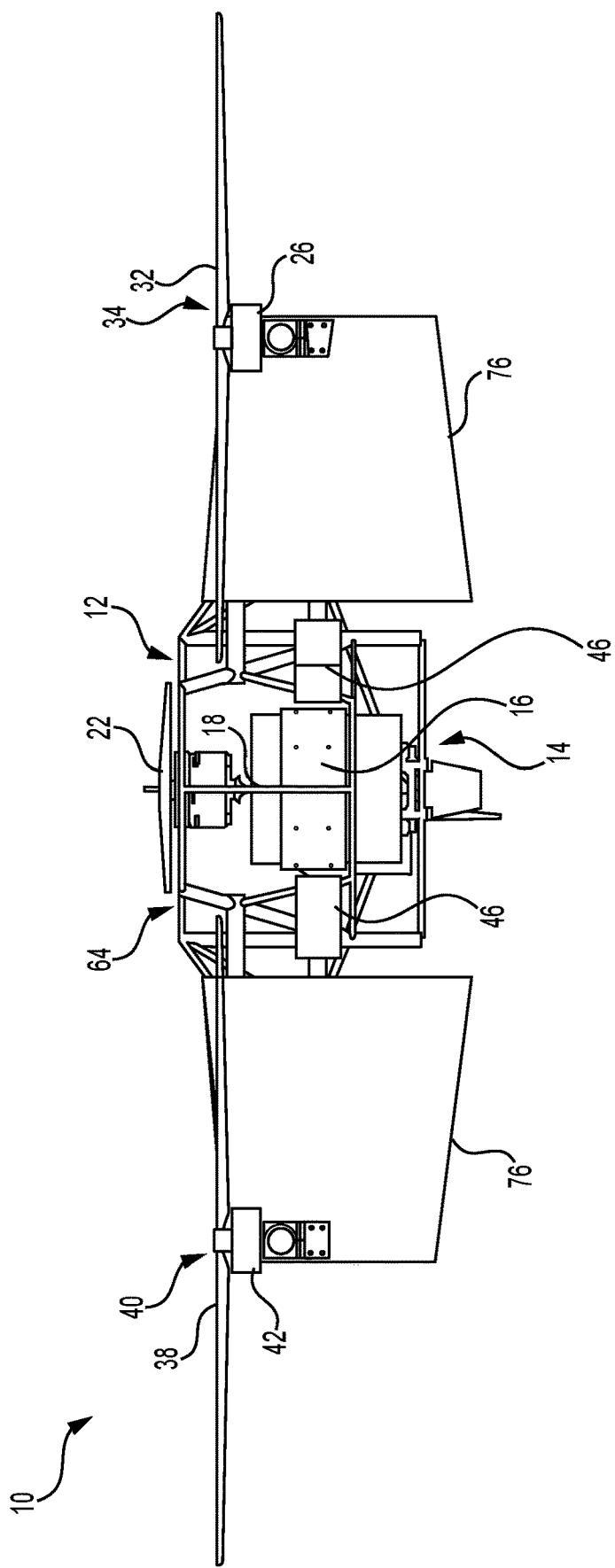
FIG. 5 shows a front view of the example aerial vehicle shown in FIG. 3 with cover portions removed to reveal the example chassis of the aerial vehicle according to a further aspect of the present disclosure.

FIG. 5 shows a front view of the example aerial vehicle 10 shown in FIG. 3 with cover portions 66 (FIG. 1A) removed to reveal the example chassis 12 of the aerial vehicle 10. As shown in FIG. 5, the first propulsion member 22 coupled to the mechanical power source 18 is located at a level higher than the other propulsion members of the aerial vehicle 10 as viewed from the front of the aerial vehicle 10. In addition, in the example shown in FIG. 5, the second propulsion member 32, the third propulsion member 34, the fourth propulsion member 38, and the fifth propulsion member 40 are located at substantially the same level as viewed from the front of the aerial vehicle 10.

Other relationships of the levels of the propulsion members are also contemplated. For example, all the propulsion members may be located at substantially the same level as viewed from the front of the aerial vehicle 10, and in some examples, pairs of the propulsion members may be located at substantially the same level, for example, with different pairs of the propulsion members being located at different levels as viewed from the front of the aerial vehicle 10.

Figure 6:
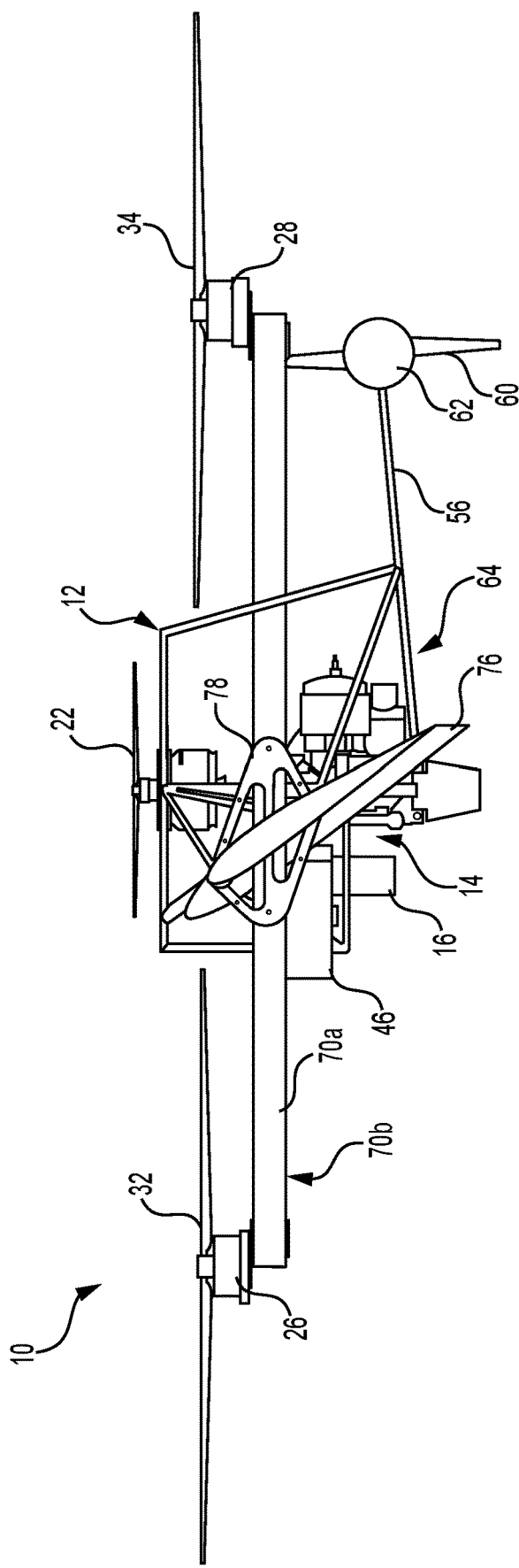
FIG. 6 shows a side view of the example aerial vehicle shown in FIG. 3 with cover portions removed to reveal the example chassis of the aerial vehicle according to another aspect of the present disclosure.

FIG. 6 shows a side view of the example aerial vehicle 10 shown in FIG. 3 with the cover portions 66 (FIG. 1A) removed to reveal the example chassis 12 of the aerial vehicle 10. As shown in FIG. 6, in some examples of the aerial vehicle 10, the rotor 60 is located at a level below the other propulsion members as viewed from the side of the aerial vehicle 10. As shown, the tail section 56 extends from the core 64 of the chassis 12 from a position below the rotor beams 70a and 70b. Other relationships of the levels of the rotor 60 and the propulsion members are contemplated. For example, the rotor 60 may be located at the same level as, or a level higher than, one or more of the propulsion members.

Figure 7:
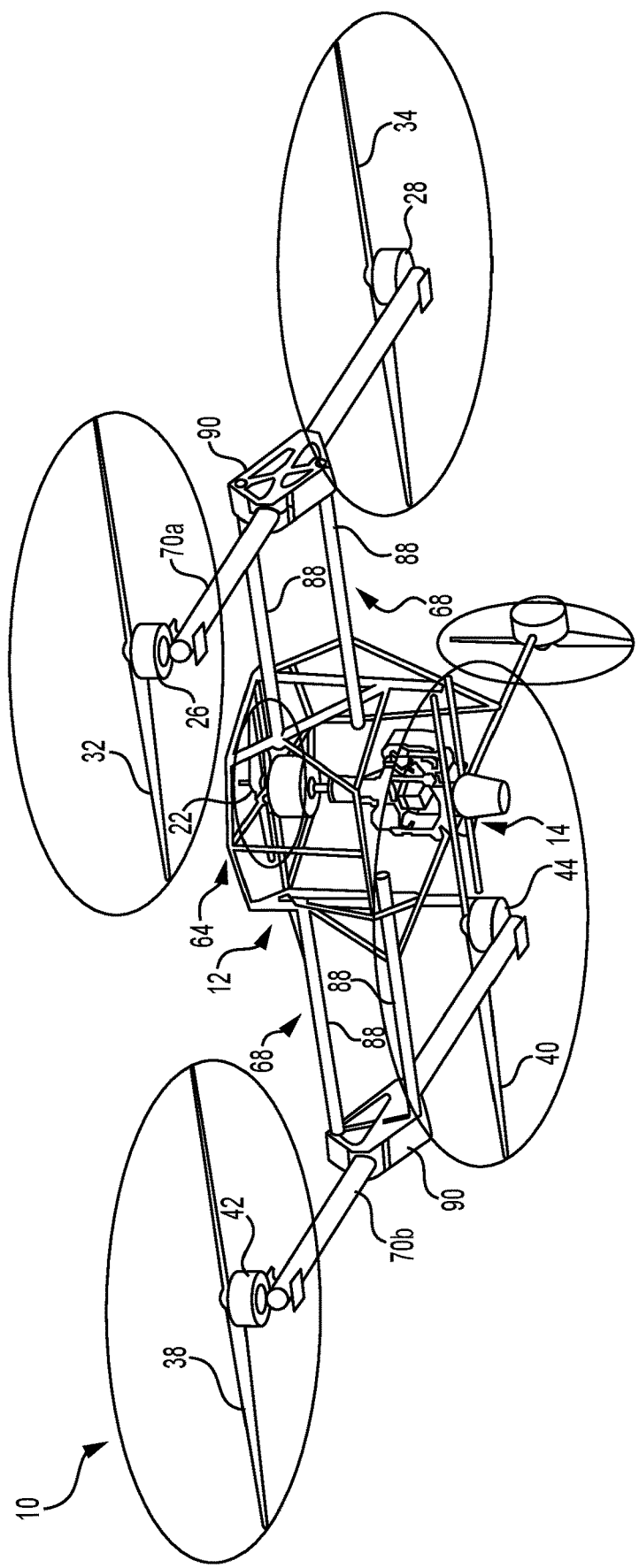
FIG. 7 shows an underside perspective view of the example aerial vehicle shown in FIG. 3 with cover portions removed to reveal the example chassis and powertrain of the aerial vehicle according to a further aspect of the present disclosure.

FIG. 7 shows an underside perspective view of the example aerial vehicle 10 shown in FIG. 3 with the cover portions 66 (FIG. 1A) and the control surfaces 76 (FIG. 3) removed to reveal the example chassis 12, lateral supports 68, and powertrain 14 of the aerial vehicle 10. As shown in FIG. 7, the example lateral supports 68 each include a pair of support beams 88 coupled at an in-board end of the support beams 88 to the core 64 of the chassis 12. Each of the remote ends of the support beams 88 are coupled to the rotor beams 70a and 70b via coupling members 90. Other numbers and/or arrangements of support beams 88 are contemplated.

Figure 8:
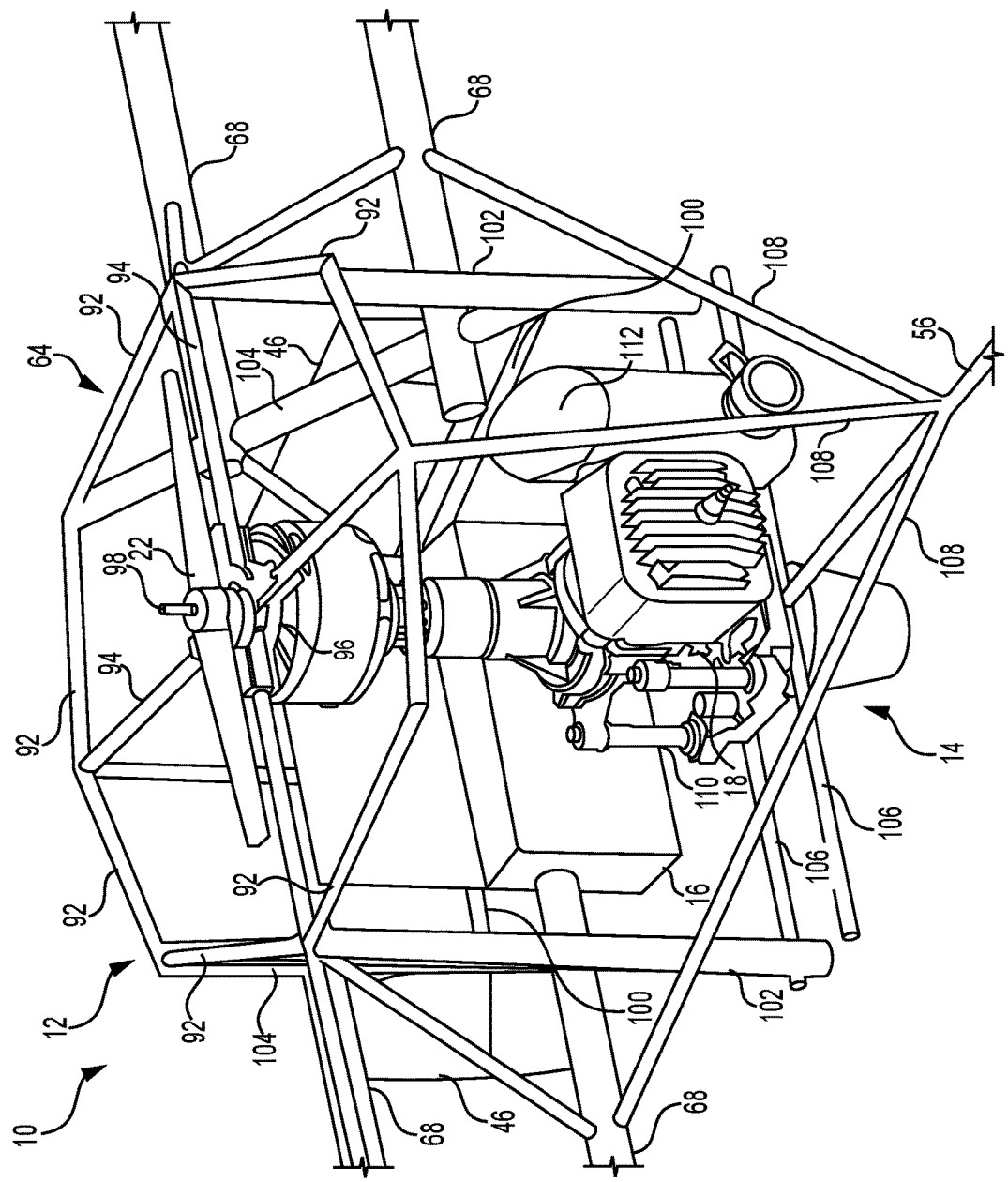
FIG. 8 shows a partial perspective view of an example relationship between the powertrain and the chassis according to an aspect of the present disclosure.

FIG. 8 shows a partial perspective view of the example aerial vehicle 10 shown in FIG. 3 with the cover portions 66 removed to reveal an example relationship between the powertrain 14 and the chassis 12. As shown in FIG. 8, the example powertrain 14 includes the mechanical power source 18 positioned in the core 64 of the chassis 12. The core 64 may include upper frame members 92 forming a polygon and a pair of upper cross members 94 extending inwardly from the upper frame members 92 and providing support for the first propulsion member 22, coupling the first propulsion member 22 to the core 64. In the example shown, the upper cross members 94 support one or more bearings 96, through which a drive shaft 98 of the first propulsion member 22 passes. The core 64 may also include lower frame members 100 and a pair of intermediate frame members 102 extending substantially transverse with respect to the upper frame members 92 and the lower frame members 100. In the example shown, the core 64 also includes a pair of buttresses 104, each coupled to and extending obliquely with respect to the upper frame members 92 and coupled to intermediate frame members 102. Median portions of the buttresses 104 are coupled to in-board ends of the lateral supports 68 and support the lateral supports 68. The example core 64 also includes a pair of powertrain supports 106 extending in a direction substantially parallel to the lateral supports 68 and supporting the powertrain 14.

As shown in FIG. 8, the tail section 56 is coupled to the core 64 at a rearmost one of the powertrain supports 106, and the core 64 includes stabilizers 108 coupling the core 64 and the lateral supports 68 to an intermediate portion of the tail section 56. As shown in FIG. 8, the aerial vehicle 10 also include a powertrain mount 110 coupling the powertrain 14 to the core 64 via the powertrain supports 106. As shown, the core 64 supports the powertrain 14, including two electric power storage devices 46 and the vehicle controller 16. Other arrangements between the chassis 12, the powertrain 14, and the vehicle controller 16 are contemplated.

Figure 9B:
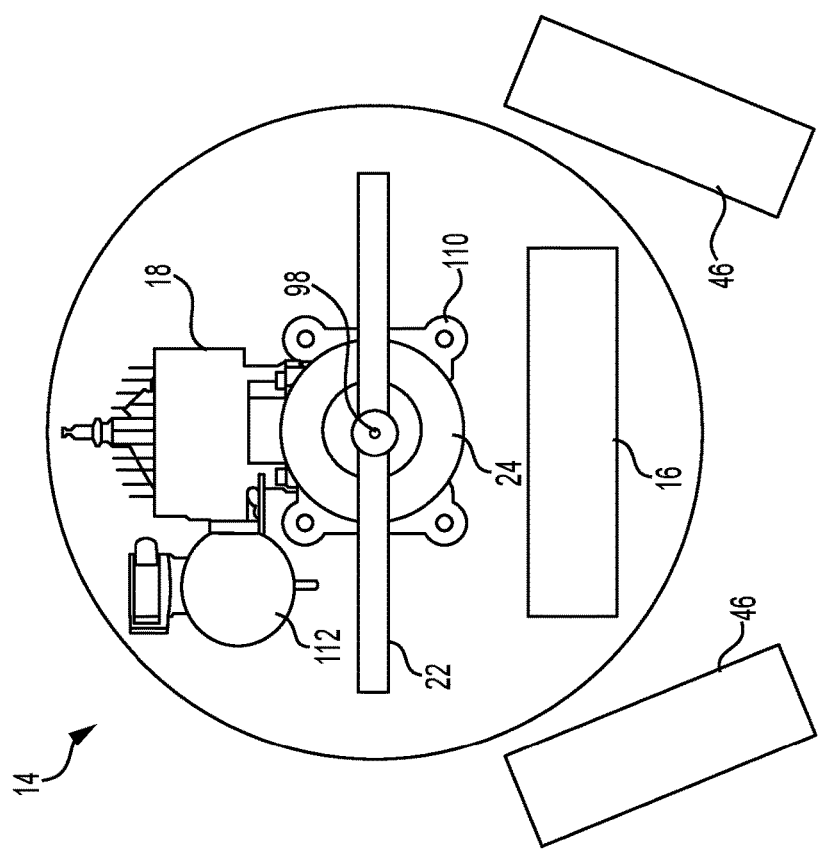
FIG. 9B shows a top view of the example powertrain shown in FIG. 9A.
Figure 9A:
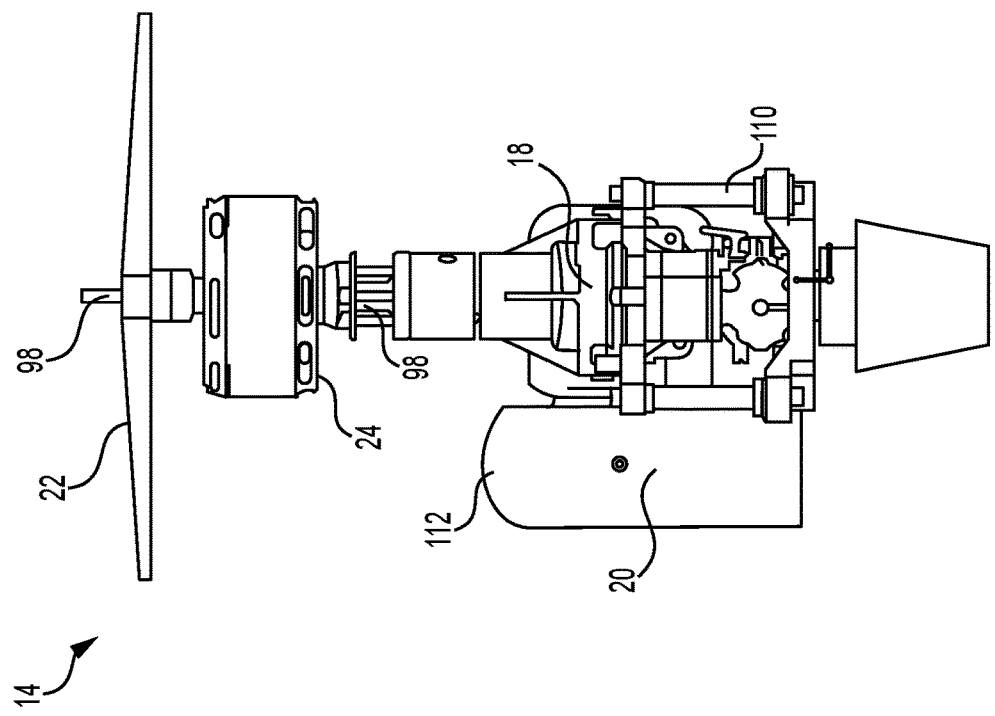
FIG. 9A shows a side view of an example powertrain for an aerial vehicle according to another aspect of the present disclosure.

FIGS. 9A and 9B show a side view and a top view, respectively, of an example powertrain 14 for the aerial vehicle 10. As shown in FIG. 9A, the example powertrain 14 is configured to be mounted such that the drive shaft of the powertrain 14 extends vertically (as shown in FIG. 9A), with the mechanical power source 18 positioned below the electric power generation device 24, and the first propulsion member 22 located above the electric power generation device 24. A fuel tank 112 is located adjacent the mechanical power source 18 and may be supported by the mechanical power source 18 and/or the powertrain mount 110.

In the example shown, a first drive shaft coupling the mechanical power source 18 to the electric power generation device 24 is hollow, and a second drive shaft coupling the mechanical power source 18 to the first propulsion member 22 extends through the first, hollow drive shaft to the first propulsion member 22. This enables the axis of the mechanical power source 18 and the axis of the electric power generation device 24 to be parallel (e.g., collinear), resulting in a compact and vertically aligned assembly. In some such examples, the first propulsion member 22 and the electric power generation device 24 may be on the same end of the mechanical power source 18, for example, such that the electric power generation device 24 is located between the mechanical power source 18 and the first propulsion member 22, as shown in FIG. 9A.

As shown in FIGS. 9A and 9B, according to the example arrangement shown, the thrust force provided by operation of the first propulsion member 22 forces air down over the components of the powertrain 14, thereby providing an inherent cooling effect. As shown in FIG. 9B, the example shown includes two electric power storage devices 46 and the vehicle controller 16 arranged, such that the thrust force produced by operation of the first propulsion member 22 will provide a cooling effect for the electric power storage devices 46 and the vehicle controller 16.

In some embodiments, the cover portions 66 (see FIG. 1A) may additionally include openings to facilitate the flow of the air from the thrust force over one or more of the components of the powertrain 14, thereby enhancing cooling, which may be important for reliable operation of the electric power storage devices 46, the vehicle controller 16, the mechanical power source 18, and/or the electric power generation device 24.

Figure 10:
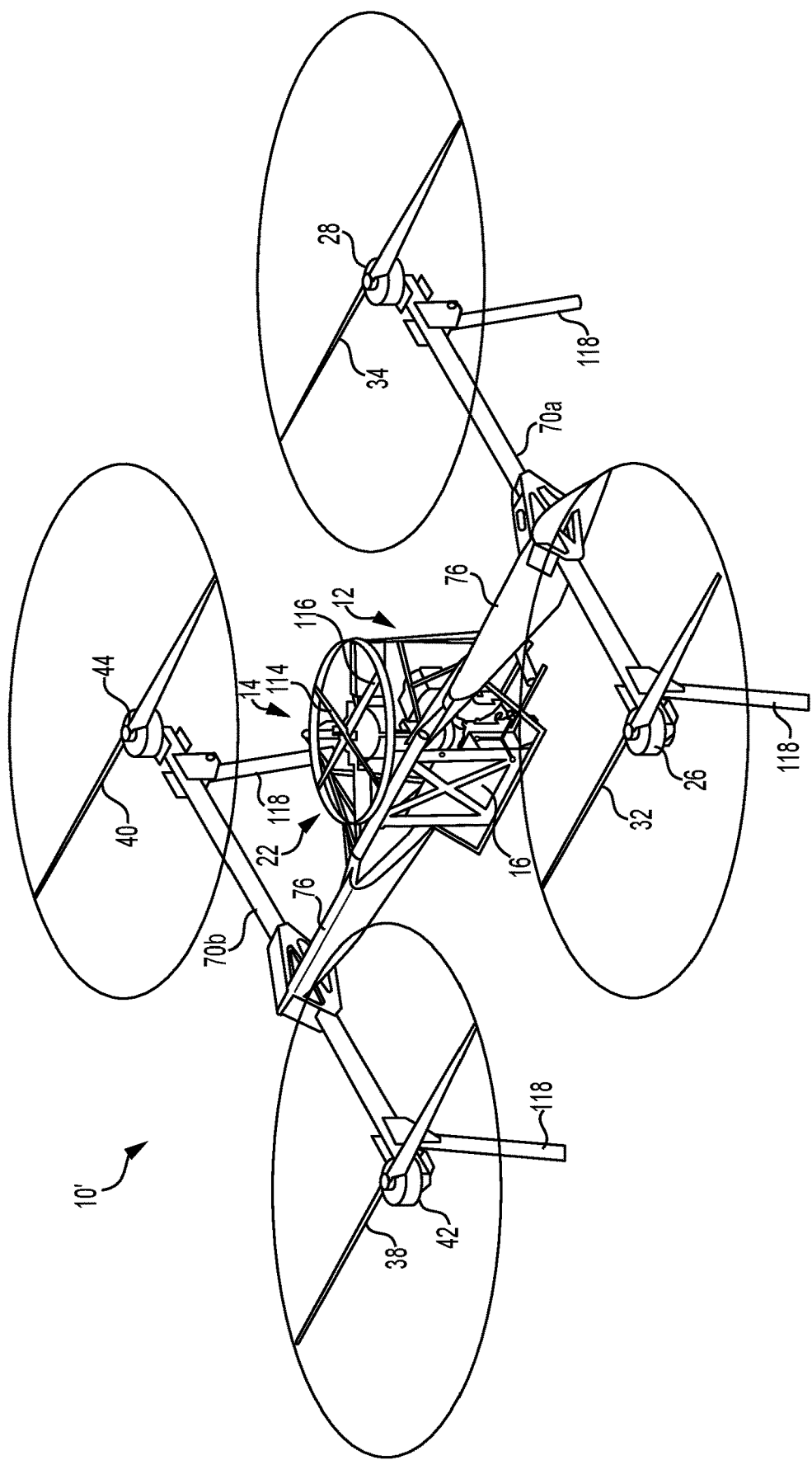
FIG. 10 shows an overhead perspective view of another example aerial vehicle with cover portions removed to reveal an example chassis of the aerial vehicle according to a further aspect of the present disclosure.

FIG. 10 shows an overhead perspective view of another example aerial vehicle 10' with cover portions 66 (FIG. 1A) removed to reveal an example chassis 12 of the aerial vehicle 10'. The example aerial vehicle 10' shown in FIG. 10 does not include a tail section or a rotor, such as shown in the example aerial vehicle 10 of FIGS. 1A, 1B, 3, 4, and 6-8. Rather, in order to at least partially control yaw of the aerial vehicle 10' shown in FIG. 10, the first propulsion member 22 includes a first propeller 114 and a second propeller 116, and the first propeller 114 and the second propeller 116 are counter-rotating propellers having common axes of rotation. In some examples, one or more of the other propulsion members of the aerial vehicle 10' may include first and second propellers that counter-rotate. By controlling the counter-rotation of the first propeller 114 or the second propeller 116, yaw of the aerial vehicle 10' inherent to the direction of rotation of the other of the first propeller 114 or the second propeller 116 may be at least partially counteracted, thus enabling at least partial control of yaw of the aerial vehicle 10'.

In some examples, the vehicle controller 16 (e.g., the flight controller 48 and/or the powertrain controller 50) may be configured to control the counter-rotating propeller. In addition, one or more of the propulsion members other than the first propulsion member 22 (and/or other propulsion members coupled to a mechanical power source) may be controlled to rotate directions opposite from one another. The aerial vehicle 10' further may include a rotor and one or more counter-rotating propellers and/or counter-rotating propulsion members.

In addition, the example aerial vehicle 10' shown in FIG. 10 includes support legs 118 for supporting the aerial vehicle 10' while on the ground. Although the example shown in FIG. 10 includes four support legs 118, fewer or more support legs are contemplated. Although the example aerial vehicle 10' shown in FIG. 10 does not include a tail section 56 or a rotor 60, the example aerial vehicle 10' shown in FIG. 10 may include features consistent with any or all the features described in relation to the example aerial vehicles 10 shown in FIGS. 1A-9.

Figure 11:
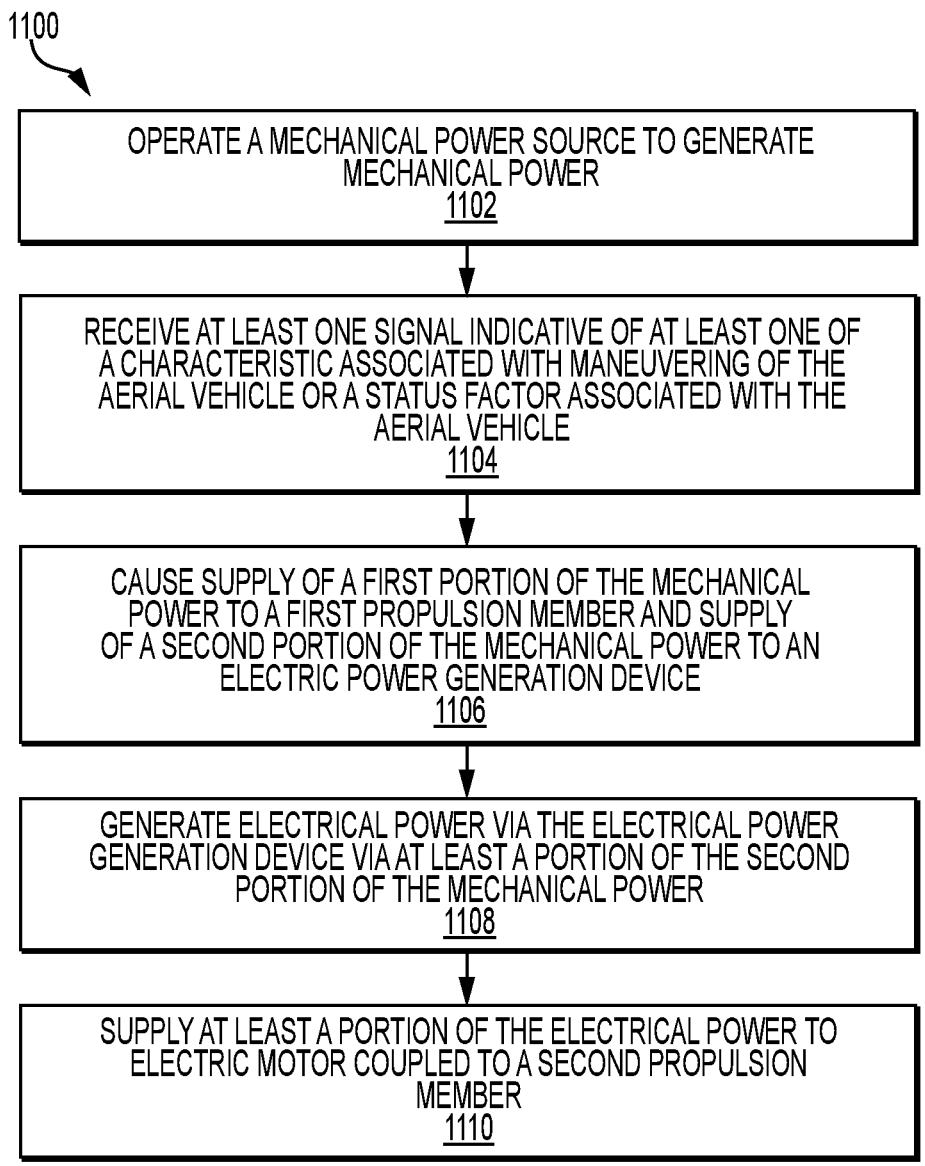
FIG. 11 is a block diagram of an example method for controlling a powertrain of an aerial vehicle.

FIG. 11 is a block diagram of an example method for controlling a powertrain of an aerial vehicle illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 11 is a flow diagram of an example method 1100 for controlling a powertrain of an aerial vehicle. At 1102, the example method 1100 may include operating a mechanical power source to generate mechanical power. For example, an internal combustion engine may be operated to rotate an output shaft to generate mechanical torque and/or power.

At 1104, the example method 1100 may also include receiving at least one signal indicative of at least one of a characteristic associated with maneuvering of the aerial vehicle or a status factor associated with the aerial vehicle. For example, one or more sensors associated with the aerial vehicle may generate at least one signal indicative of characteristics associated with maneuvering of the aerial vehicle and/or status factors associated with the aerial vehicle.

A vehicle controller may receive the at least one signal. The at least one signal indicative of a characteristic associated with maneuvering of the aerial vehicle may include at least one signal indicative of, for example, lifting off a surface on which the aerial vehicle is supported (e.g., during take-off), hovering while remaining stationary relative to the surface, changing altitude (e.g., ascending or descending), traveling at speed in a given direction, turning, changing pitch, changing roll, and/or changing yaw. The at least one signal indicative of a status factor associated with the aerial vehicle may include at least one signal indicative of, for example, the amount of fuel carried by the aerial vehicle, the weight of the aerial vehicle, the payload carried by the aerial vehicle, the weight distribution of the aerial vehicle, a level of charge of one or more electric power storage devices carried by the aerial vehicle, a temperature associated with the mechanical power source, an altitude of the aerial vehicle, and/or the efficiency of any subsystem or overall operation of the aerial vehicle.

The example method 1100, at 1106, may also include, based at least in part on the at least one signal, causing supply of a first portion of the mechanical power to a first propulsion member and causing supply of a second portion of the mechanical power to an electric power generation device. In some examples, the first portion of the mechanical power and the second portion of the mechanical power differ from one another. For example, the mechanical power source may generate mechanical power, the vehicle controller may receive the at least one signal indicative of a characteristic associated with maneuvering of the aerial vehicle and/or indicative of a status factor associated with the aerial vehicle, and based at least in part on the at least one signal, allocate portions of the mechanical power to a first propulsion member mechanically coupled to mechanical power source and to an electric power generation device, thereby splitting the mechanical power. Based at least partially on the at least one signal, the vehicle controller may change a ratio of the first portion to the second portion to account for changes in power requirements for the first propulsion member and the electric power generation device, thereby tailoring the use of power supplied by the mechanical power source to operation of the aerial vehicle.

For example, this may include increasing the first portion of the mechanical power supplied to the first propulsion member during lifting-off of the surface on which the aerial vehicle is supported, increasing altitude of the aerial vehicle, and/or level flight in a given direction. It may be advantageous during such maneuvers to increase the mechanical power supplied to the first propulsion member relative to the mechanical power supplied to the electric power generation device.

In another example, this may include increasing the second portion of the mechanical power supplied to the electric power generation device during at least one of turning the aerial vehicle and increasing altitude of the aerial vehicle. It may be advantageous during such maneuvers to increase the electric power supplied to the electric motors during such maneuvers.

In an additional example, this may include decreasing the first portion of the mechanical power supplied to the first propulsion member during descending of the aerial vehicle. In a further example, this may include decreasing the second portion of the mechanical power supplied to the electric power generation device during descending of the aerial vehicle and/or hovering. In some examples, this may include dynamically changing the first portion of the mechanical power and/or the second portion of the mechanical power during operation of the mechanical power source. In some examples, the method may also include storing at least a portion of the electrical power via one or more electric power storage devices.

The example method 1100, at 1108, may further include generating electrical power via the electrical power generation device via at least a portion of the second portion of the mechanical power. For example, the electrical power generation device may convert at least a portion of the mechanical power supplied by the mechanical power source into electrical power.

At 1110, the example method 1100 may further include supplying at least a portion of the electrical power to an electric motor coupled to a second propulsion member. For example, the electric motor may use the electrical power to drive a second propulsion member of the aerial vehicle. In some examples, portions of the electrical power may be supplied to additional electric motors, which may use the electrical power to drive additional respective propulsion members.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Figure 12:
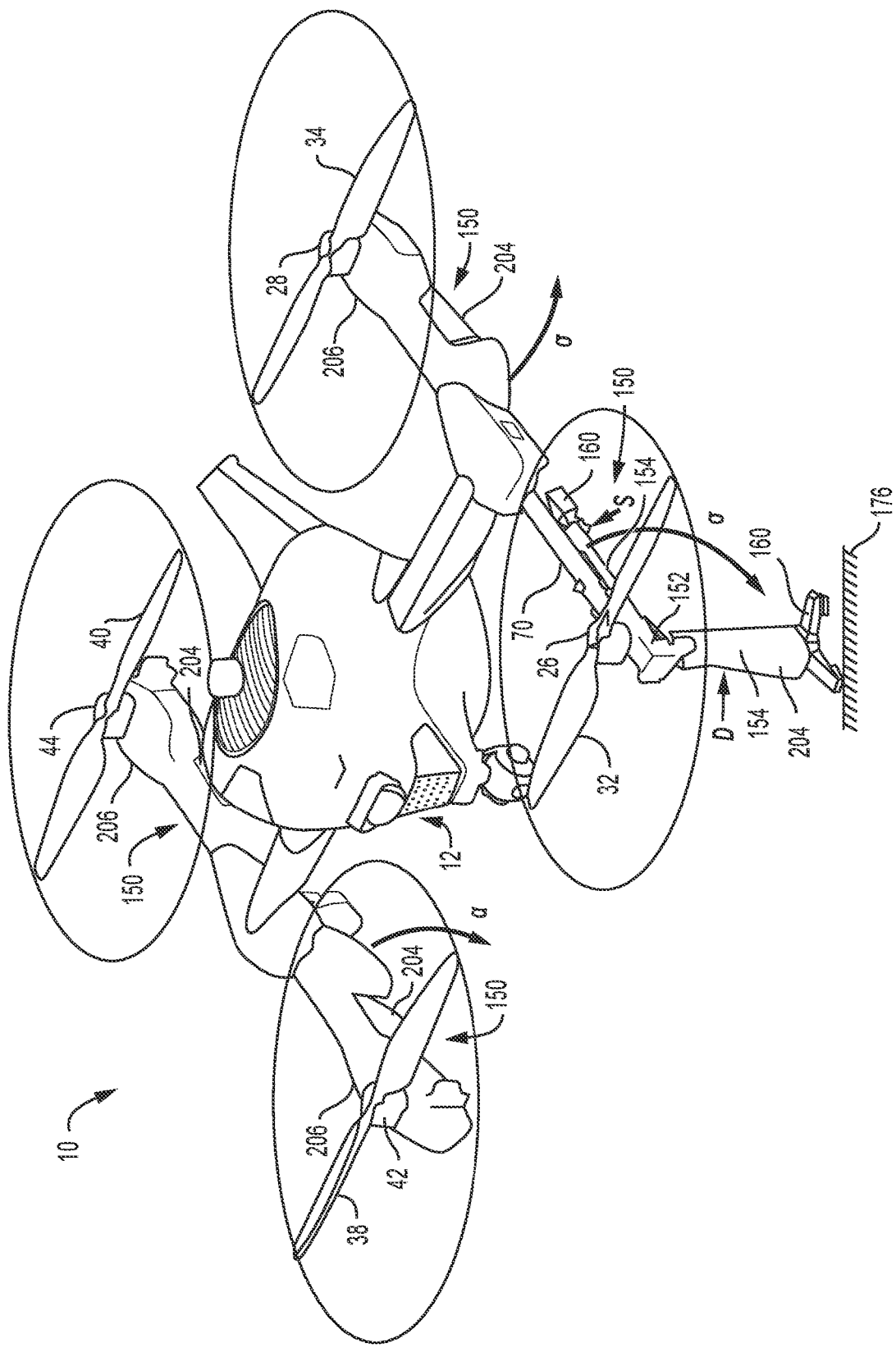
FIG. 12 is a front overhead perspective view of an example aerial vehicle including an example landing support assembly in a deployed state according to an aspect of the present disclosure.
Figure 13:
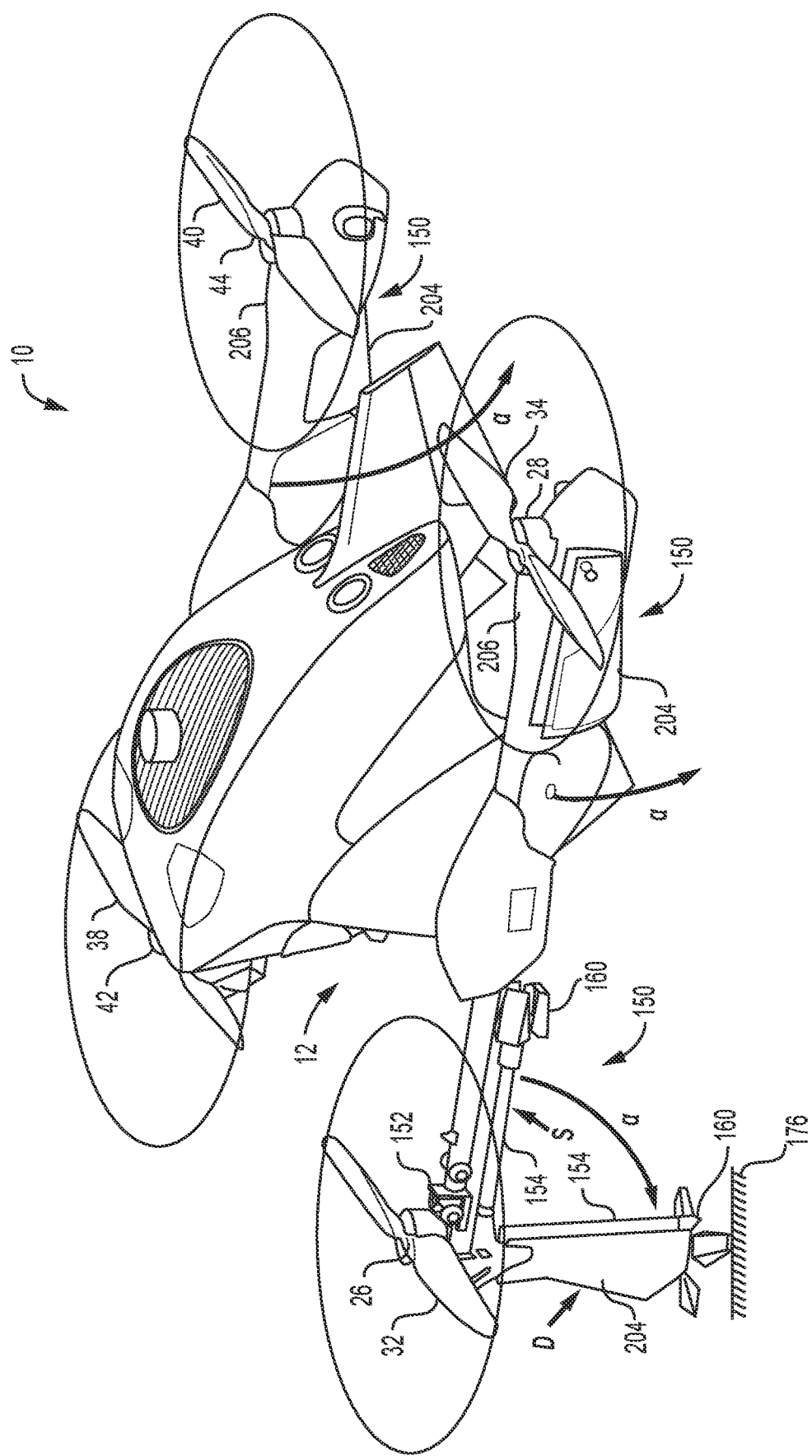
FIG. 13 is a rear overhead perspective view of an example aerial vehicle including an example landing support assembly in a deployed state according to an aspect of the present disclosure.

FIG. 12 is a front overhead perspective view, and FIG. 13 is a rear overhead perspective view, of an example aerial vehicle 10, including an example landing support assembly 150 in a deployed state according to an aspect of the present disclosure. FIGS. 12 and 13 show a first landing support assembly 150, which is configured to pivot through an angle σ relative to the chassis 12 from a stowed state (shown at S in FIGS. 12 and 13) to a deployed state (shown at D in FIGS. 12 and 13). In some examples, the angle σ may be substantially ninety degrees, although other angles are contemplated. Only one landing support assembly 150 shown in FIGS. 12 and 13 is in the deployed state, with the other three landing support assemblies 150 shown in the stowed state. In some embodiments, two or more of the landing support assemblies 150 may be configured to pivot between the stowed state and the deployed state substantially simultaneously and/or in sequence. Although the embodiment shown in FIGS. 12 and 13 includes four landing support assemblies 150, aerial vehicles having fewer or more landing support assemblies 150 are contemplated. As shown in FIGS. 12 and 13, one or more of the landing support assemblies 150 may be coupled to the chassis 12 adjacent a respective propulsion member 22, 32, 34, and/or 38, for example, adjacent the forward end 72 of one or more of the rotor beams 70 and/or the rearward end 74 of one or more of the rotor beams 70 (see, e.g., FIG. 1, showing the forward ends 72 the rearward ends 74). In some embodiments, one or more of the landing support assemblies 150 may be coupled to the chassis 12 substantially under a respective propulsion member 22, 32, 34, and/or 38. These example configurations may assist with support of the propulsion members 22, 32, 34, and/or 38 and/or the respective electric motors 26, 28, 42, and/or 44 when the aerial vehicle 10 is not in flight. Other coupling locations for the landing support assemblies 150 are contemplated.

Figure 14:
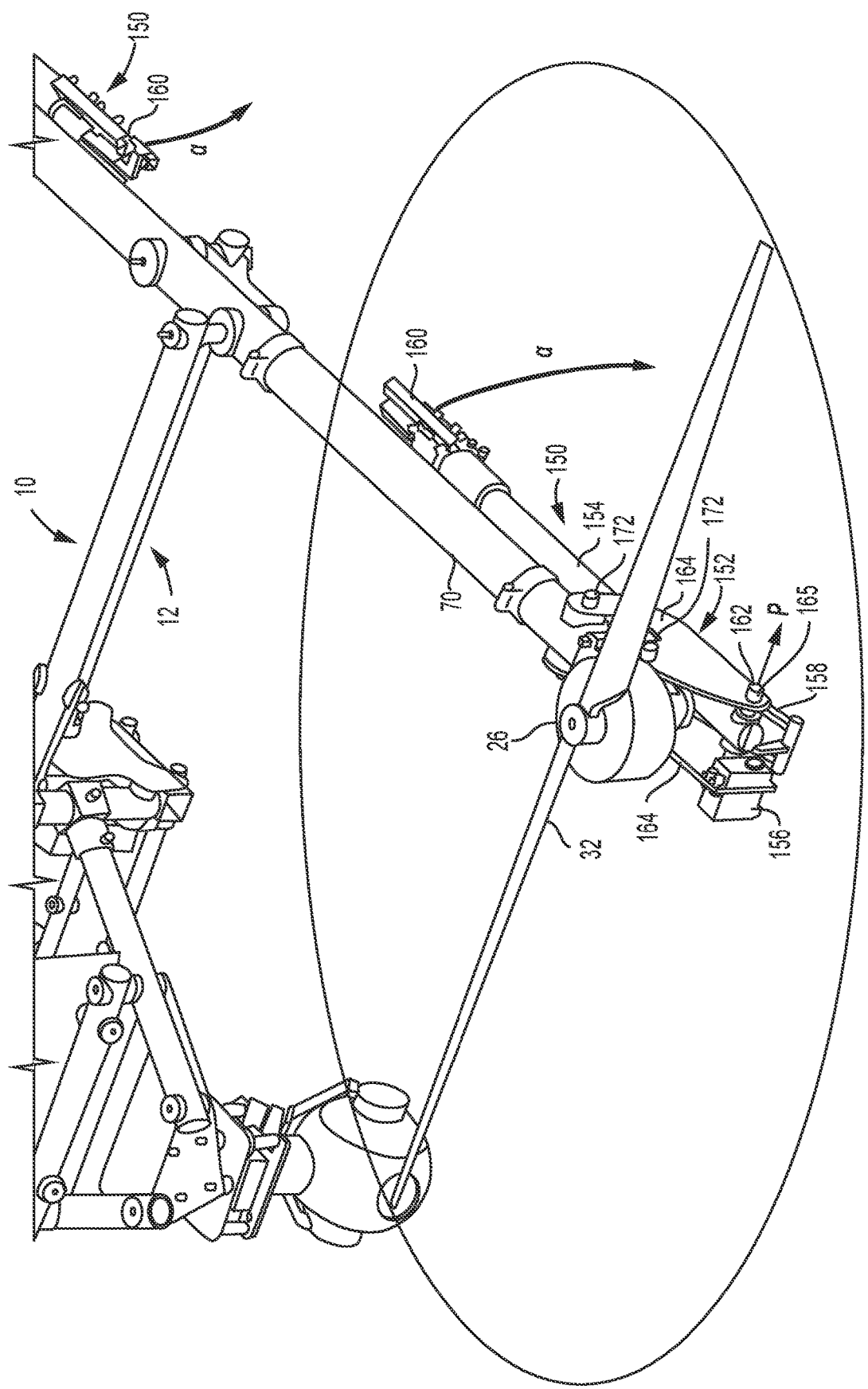
FIG. 14 is an overhead partial perspective view of an aerial vehicle with cover portions removed to reveal an example chassis of the aerial vehicle and an example landing support assembly in a stowed state according to a further aspect of the present disclosure.
Figure 15:
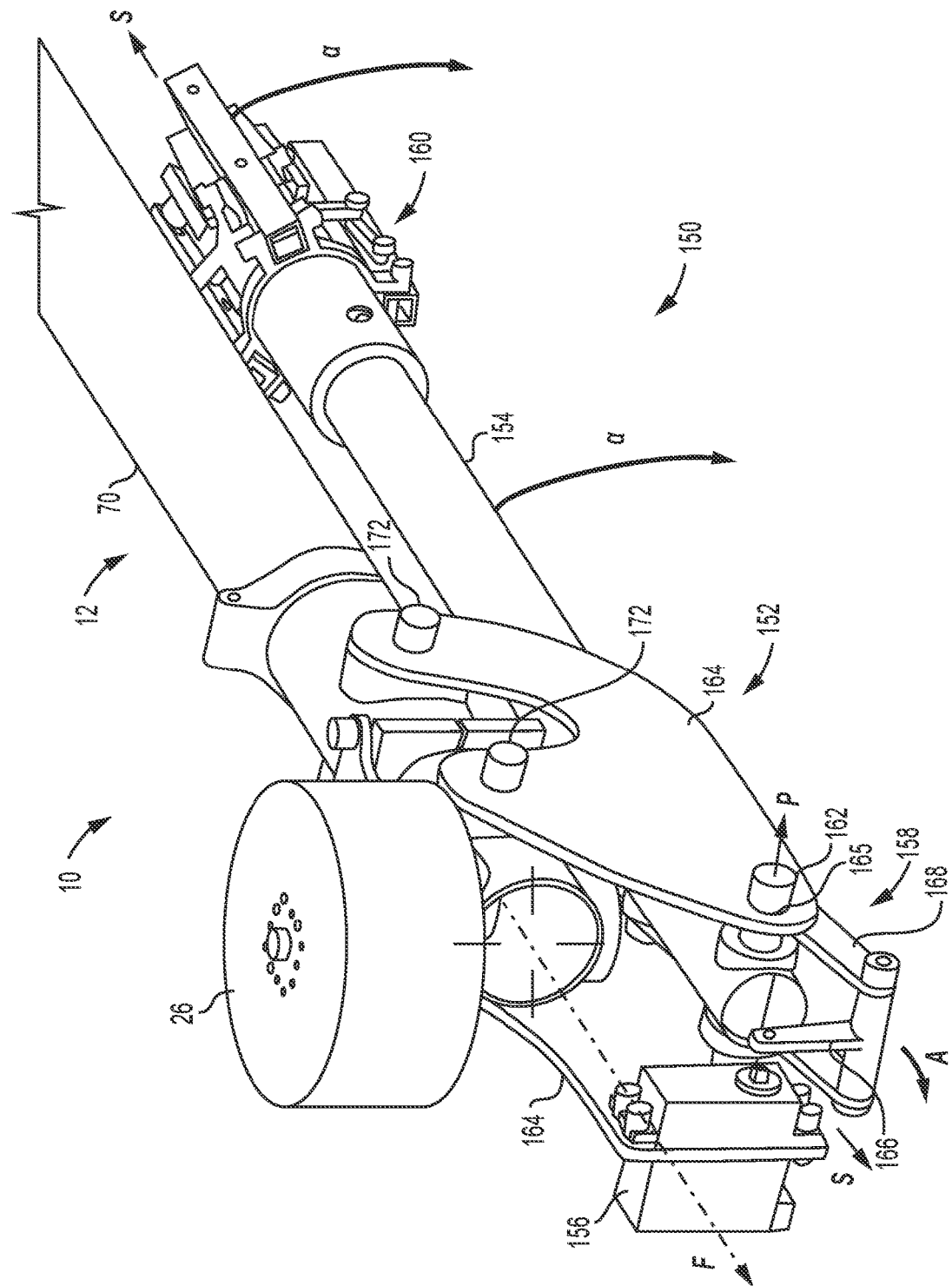
FIG. 15 is a partial perspective view of an example landing support assembly coupled to an example aerial vehicle chassis via an example bracket in the stowed state according to a further aspect of the present disclosure.

FIG. 14 is an overhead partial perspective view of an aerial vehicle 10 with cover portions removed to reveal an example chassis 12 of the aerial vehicle 10 and an example landing support assembly 150 in a stowed state, and FIG. 15 is a partial perspective view of an example landing support assembly 150 coupled to an example aerial vehicle chassis 12 via an example bracket 152 in the stowed state. As shown in FIGS. 14 and 15, some embodiments of the landing support assembly 150 include a strut 154 extendable (e.g., pivotable) to a deployed state for at least partially supporting the aerial vehicle 150 on the surface (e.g., on terrain, the ground, or a platform) and retractable to a stowed state during flight of the aerial vehicle 10.

The landing support assembly 150 may include the bracket 152 coupled to the strut 154 and the chassis 12 of the aerial vehicle 10, for example, such that the strut 154 is able to pivot with respect to the bracket 152 between the stowed state and the deployed state through an angle σ. In some embodiments, the landing support assembly 150 may include a strut actuator 156 coupled to the strut 154 via a linkage 158. The strut actuator 156 may be positioned and/or configured to cause the strut 154 to pivot relative to the bracket 152 between the deployed state and the stowed state. As shown in FIGS. 14 and 15 and outlined in more detail herein, the landing support assembly 150 may also include a foot 160 coupled to an end of the strut 154 remote from the bracket 152. The foot 160, in some embodiments, may be positioned and/or configured to change between a retracted state (see e.g., FIGS. 14 and 15) during flight and an at least partially splayed state for at least partially supporting aerial vehicle (see, e.g., FIGS. 19A and 19B). As outlined in more detail herein with respect to FIGS. 22A, 22B, and 22C, the foot 160, in the retracted state, may have a first cross-sectional area, when viewed down the longitudinal length of the strut 154, and in the at least partially splayed state, may have a second cross-sectional area, when viewed down the longitudinal length of the strut 154, that is greater than the first cross-sectional area. This example configuration may result in an ability to stow the landing support assembly 150 while it occupies a relatively smaller volume, for example, due to the retracted state of the foot 160, and deploy the landing support assembly 150, such that it has a relatively larger support area by at least partially splaying the foot 160 when the landing support assembly 150 is in the deployed state. This may result in providing a more stable platform for the aerial vehicle 10 when not in flight, particularly when the aerial vehicle 10 is supported in a relatively loose or soft supporting surface, such as dirt, gravel, sand, or snow.

Figure 16:
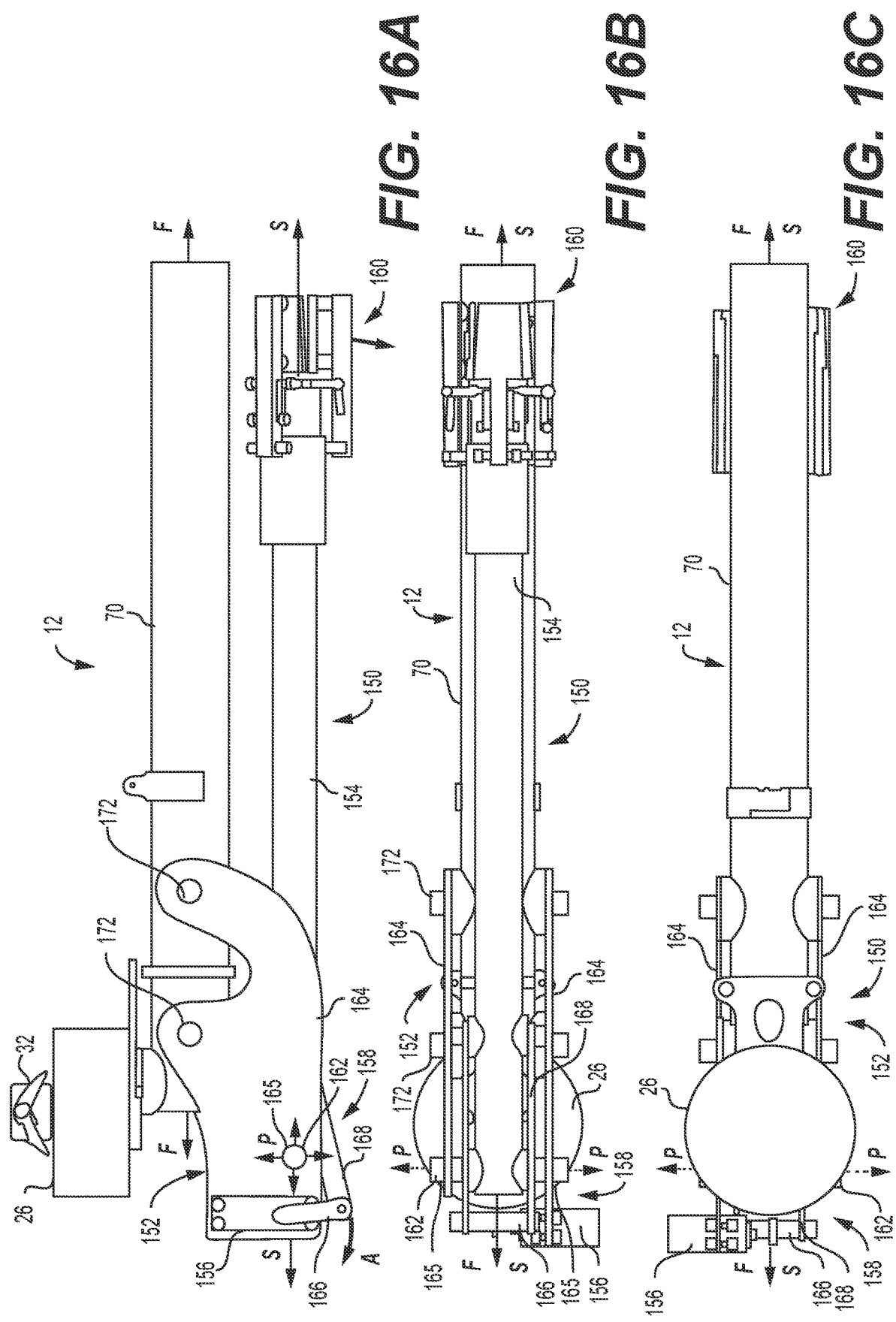
FIG. 16A is a side view the example landing support assembly shown in FIG. 15 coupled to an example aerial vehicle chassis via an example bracket in the stowed state according to a further aspect of the present disclosure.
FIG. 16B is a bottom view of the example landing support assembly shown in FIG. 15 coupled to an example aerial vehicle chassis via an example bracket in the stowed state according to a further aspect of the present disclosure
FIG. 16C is a top view of the example landing support assembly shown in FIG. 15 coupled to an example aerial vehicle chassis via an example bracket in the stowed state according to a further aspect of the present disclosure.

FIG. 16A, FIG. 16B, and FIG. 16C are respectively side, bottom, and top views of the example landing support assembly 150 shown in FIGS. 14 and 15 coupled to an example aerial vehicle chassis 12 via an example bracket 152 in the stowed state according to a further aspect of the present disclosure. As shown in FIGS. 15 and 16A through 16C, the strut 154 may define a longitudinal strut axis S, and the chassis 12 may include a frame member (e.g., the rotor beam 70) that defines a longitudinal frame member axis F. In some embodiments, when the strut 154 is in the stowed state, the longitudinal strut axis S and the longitudinal frame member axis F may be substantially parallel with respect to one another, for example, as shown in FIGS. 14, 15, and 16A through 16C. In some embodiments, when the strut 154 is in the deployed state, the longitudinal strut axis S and the longitudinal frame member axis F may be transverse to one another (e.g., substantially perpendicular to one another), for example, as shown FIGS. 12 and 13. Other angles of deployment are contemplated, such as less than ninety degrees or more than ninety degrees.

As shown in FIGS. 14 and 15, for some embodiments, the bracket 152 defines a pivot axis P about which the strut 154 pivots when moved between the stowed state and the deployed state. In some embodiments, the strut 154 may be coupled to the bracket 152 via a pivot pin 162 at the pivot axis P. In some embodiments, the bracket 154 may include two opposing bracket plates 164. One or more of the bracket plates 164 may define opposing holes 165 that receive the pivot pin 162. Other pivoting and/or translational arrangements are contemplated.

Figure 17:
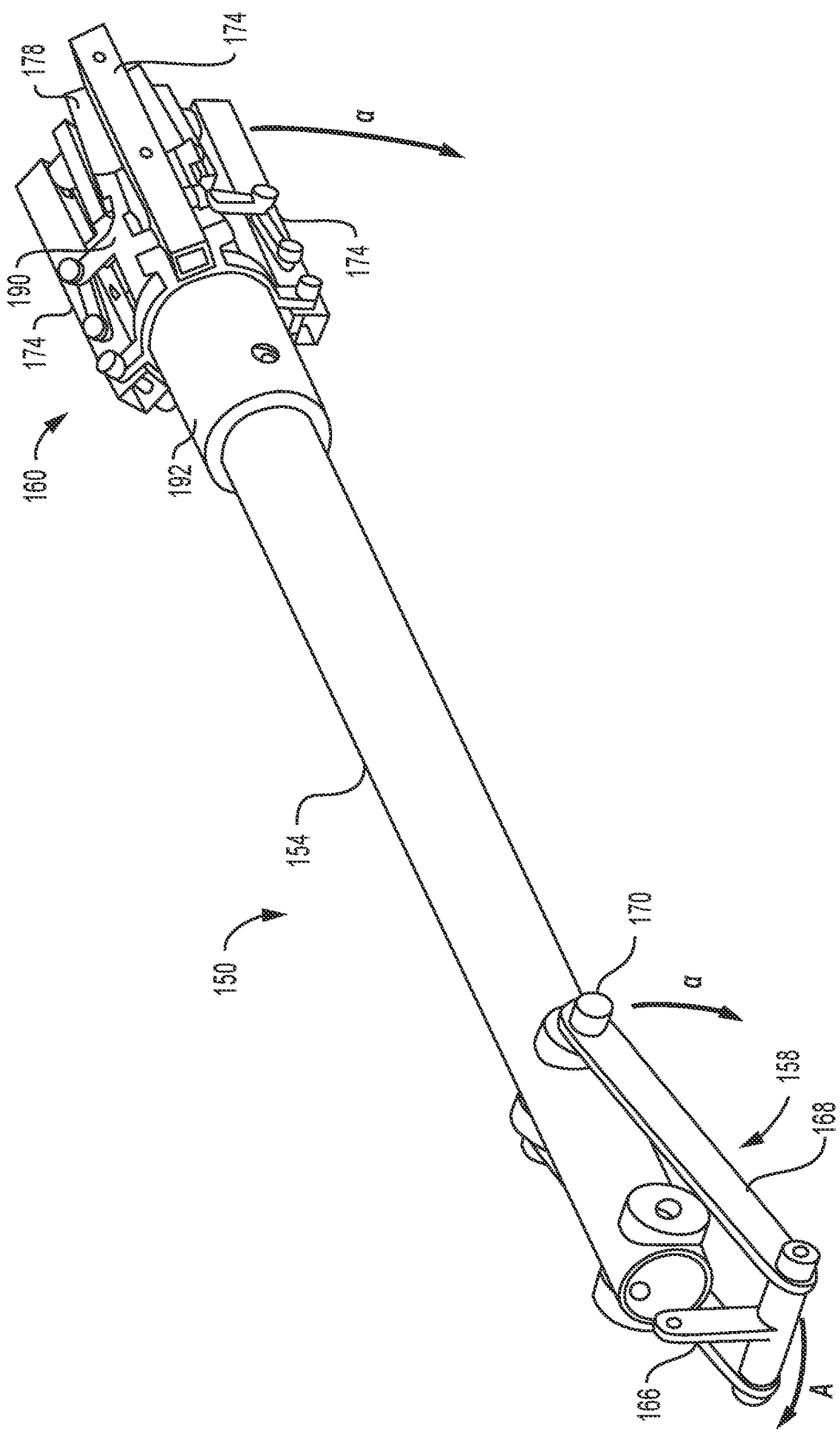
FIG. 17 is a partial perspective view of an example landing support assembly in the stowed state according to a further aspect of the present disclosure.

As shown in FIGS. 14, 15, and 16A through 16C, for some embodiments, the linkage 158 may include a crank link 166 coupled to the strut actuator 156 and a rocker link 168 pivotally coupled to the crank link 166 and pivotally coupled to the strut 154 at an attachment point 170 intermediate (between) the bracket 152 and the foot 160. In some embodiments, the strut actuator 156 may be configured and/or positioned to rotate the crank link 166, thereby causing the rocker link 168 to extend the strut 154 to the deployed state and retract the strut 154 the stowed state. For example, the strut actuator 156 may include a motor (e.g., an electrically-powered motor, such as a stepper motor). For example, as shown in FIG. 17, an end of the rocker link 168 opposite the coupling to the crank link 166 may be pivotally coupled to the strut 154 at the attachment point 170. As shown in FIGS. 14, 15, and 16A through 16C, the opposing bracket plates 164 may be coupled to the frame member of the chassis 12 (e.g., the rotor beam 70) via one or more fasteners 172, which may include one or more of structural adhesives, welds, rivets, or bolts. In some embodiments, as the strut actuator 156 is operated, the crank link 166 causes the rocker link 168, which may be pivotally coupled to the crank link 166, to be pulled along an arc A, which, in turn, causes the strut 154 to pivot about the pivot point P between the stowed state and the deployed state. The strut actuator 156 may include one or more of a motor or a linear actuator. Other linkage arrangements for pivoting the strut 154 between the stowed state and the deployed state are contemplated. In some embodiments, the linkage 158 may include springs, dampers, shock absorbers, shock absorbing components, and/or flexible components, for example, to dampen forces transmitted to the landing support assembly 150 (e.g., the strut 154 and/or bracket 152) and/or the aerial vehicle 10 (e.g., the chassis 12). Although the example rotor beam 70 and the example strut 154 are each hollow tubular members having a substantially circular cross-section, other configurations of frame members and struts are contemplated, including those having cross-sectional shapes other than substantially circular, such as rectangular, triangular, polygonal, or elliptical, and in some embodiments, the cross-sectional shape and/or the cross-sectional size may remain constant or vary along the length of the frame member (e.g., the rotor beam 70) and/or the strut 154.

FIG. 17 is a partial perspective view of an example landing support assembly 150 in the stowed state according to a further aspect of the present disclosure, and FIG. 18A and FIG. 18B are a partial side view and a partial top view of the example landing support assembly 150 shown in FIG. 17 in the stowed state with an example foot 160 in the retracted state, according to a further aspect of the present disclosure. FIG. 19A is a partial perspective view of an example landing support 150 assembly in the deployed state and having a foot 160 in an at least partially splayed state, and FIG. 19B is a partial perspective view of the example landing support assembly 150 shown in FIG. 19A in the deployed state and having a foot 160 in a substantially fully splayed state, according to a further aspect of the present disclosure.

As shown in FIGS. 17, 18A, 19A, and 19B, in some embodiments, the foot 160 may include a plurality of lateral supports 174 configured to pivot relative to the strut 154 between a retracted state during flight (see, e.g., FIGS. 17, 18A, and 18B) and an at least partially splayed state for at least partially supporting the aerial vehicle 10 on a surface 176 (see, e.g., FIGS. 19A and 19B). Although the examples shown includes three lateral supports 174, other numbers of lateral supports 174 are contemplated, such as, for example, one, two, or more than three (e.g., four or five). The foot 160 may include a support pad 178 coupled to an underside of each of the lateral supports 174. In some embodiments, the support pads 178 may be configured and/or positioned to provide at least one of a cushion between the underside of the lateral supports 174 and the surface 176 or traction between the lateral supports 174 and the surface 176. As shown in FIGS. 19A and 19B, some embodiments of the foot 160 may include a support isolator 180 coupled to one or more of the support pads 178 and the underside of each of the lateral supports 174 and configured and/or positioned to provide shock absorption between the support pads 178 and the underside of the lateral supports 174. In some examples, the support isolators 180 may include an elastomeric and/or resilient isolator, such as a rubber or synthetic support. Other materials are contemplated.

Figure 20A:
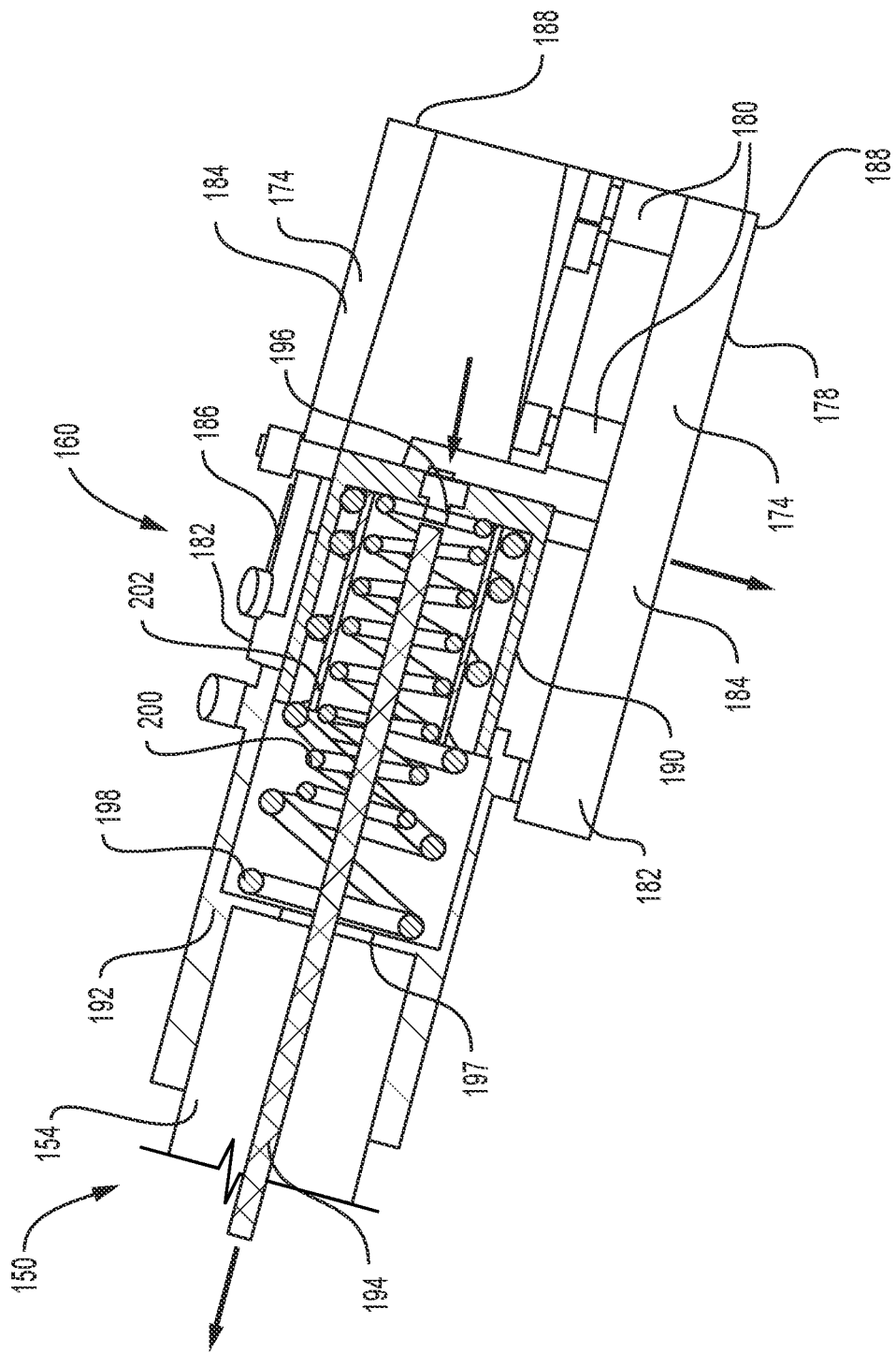
FIG. 20A is a partial side section view of an example foot in the retracted state according to a further aspect of the present disclosure.
Figure 20B:
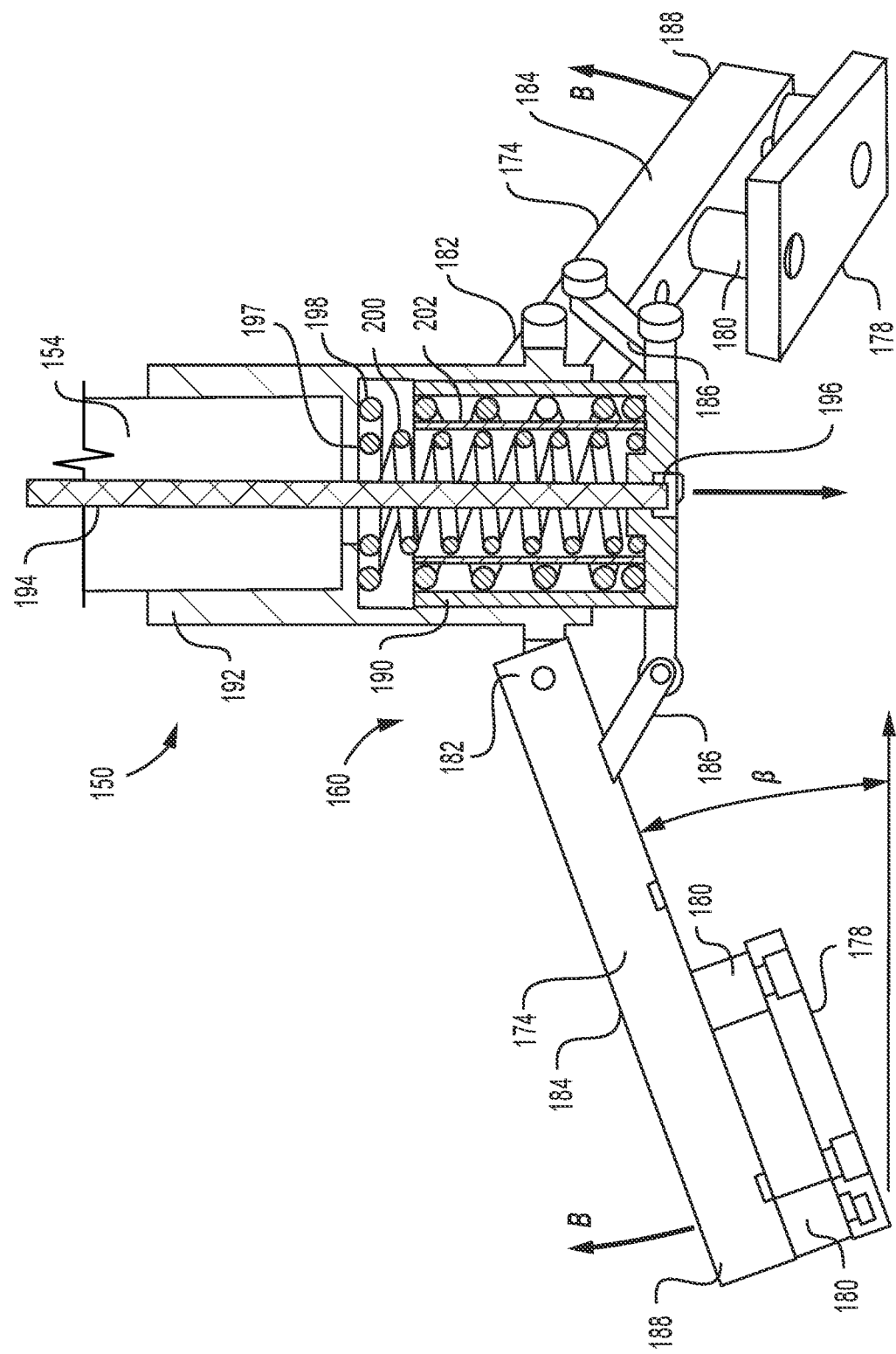
FIG. 20B is a partial side section view of the example foot shown in FIG. 20A in the at least partially splayed state according to a further aspect of the present disclosure.
Figure 20C:
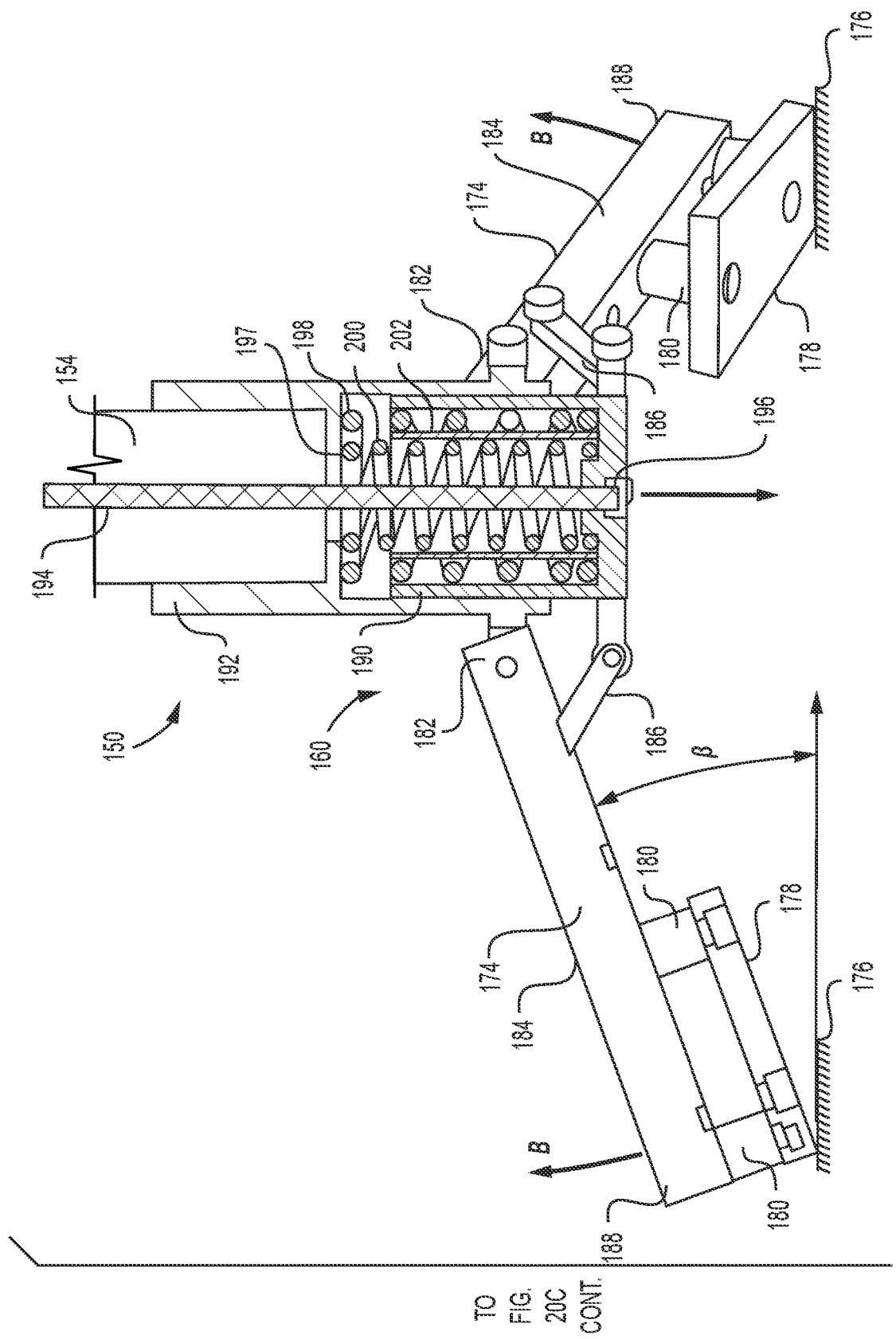
FIG. 20C is a partial side section view of the example foot shown in FIG. 20A progressing from an at least partially splayed state to a substantially fully splayed state according to a further aspect of the present disclosure.
Figure 20C:
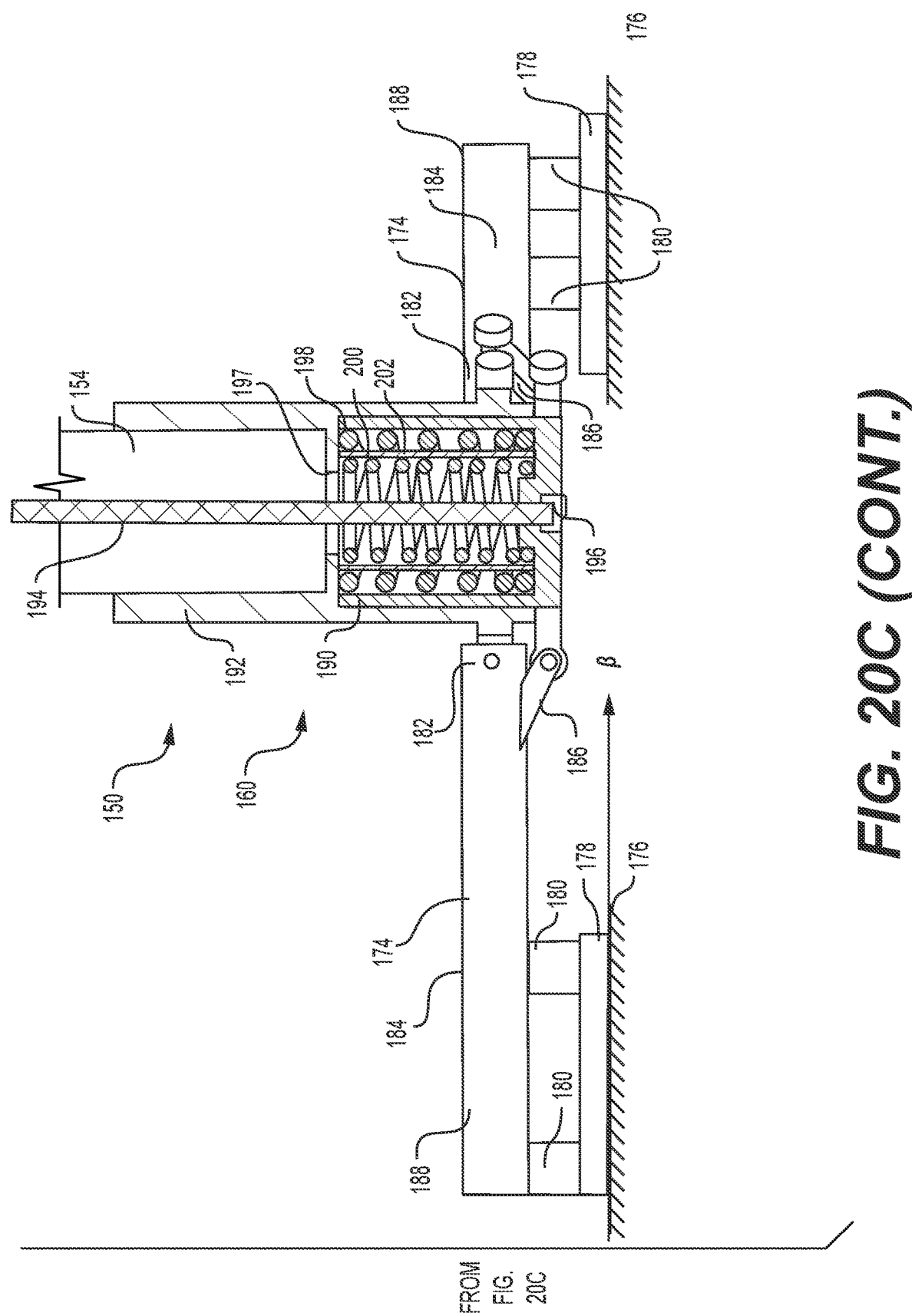

FIG. 20A is a partial side section view of an example foot 160 in the retracted state, FIG. 20B is a partial side section view of the example foot 160 shown in FIG. 20A in the at least partially splayed state, and FIG. 20C is a partial side section view of the example foot 160 shown in FIG. 20A progressing from an at least partially splayed state to a substantially fully splayed state, according to a further aspect of the present disclosure. As shown in FIGS. 19A, 19B, and FIGS. 20A through 20C, in some embodiments, one or more of the lateral supports 174 may include an attachment end 182 pivotally coupled to the strut 154, an intermediate portion 184 coupled to a deployment link 186 (pivotally coupled), and/or a support end 188 opposite the attachment end 182. As shown in FIGS. 20A through 20C, in some embodiments, the foot 160 further may include an extender 190 coupled to the strut 154 at the end of the strut 154 remote from the bracket 152 and configured to reciprocate relative to the end of the strut 154. As shown, in some embodiments, the extender 190 is pivotally coupled to a first end of each of the deployment links 186, and a second end of each of the deployment links 186 is pivotally coupled to the intermediate portion 184 of a respective lateral support 174, for example, such that reciprocation of the extender 190 causes the lateral supports 174 to pivot relative to the strut 154 between the retracted state and the at least partially splayed state. Other mechanical arrangements are contemplated for causing retraction and splaying of the lateral supports 174.

As shown in FIGS. 20A through 20C, some embodiments of the strut 154 may include a hollow end fixture 192, and the extender 190 may be at least partially received in the hollow end fixture 192, such that when the extender 190 extends relative the hollow end fixture 192, the lateral supports 174 at least partially retract via the deployment links 186, and when the extender 190 retracts relative to the hollow end fixture 192, the lateral supports 174 at least partially extend via the deployment links 186, for example, through an arc B to achieve the at least partially splayed state (see, e.g., FIG. 20B). In some embodiments, for example, as shown in FIG. 20B, in the at least partially splayed state, the lateral supports 174 may define and angle β relative to the horizontal (e.g., relative the surface 176 on which the aerial vehicle 10 is landing), for example, ranging from about five degrees to about sixty degrees, from about ten degrees to about forty-five degrees, from about ten degrees to about thirty degrees, or from about ten degrees to about twenty degrees (e.g., about fifteen degrees). In some embodiments, this may correspond to a landing position in which the lateral supports 174 are at least partially splayed, and as shown in FIG. 20C, as the weight of the aerial vehicle 10 begins to be supported by the landing support assembly 150, the strut 154 drives the extender 190 more fully into the end fixture 192, causing the deployment links 186 to force the lateral supports 174 upward (as shown) to a substantially fully splayed state, thereby reducing the angle β toward zero degrees, for example, until the angle β reaches zero degrees, as shown at the bottom FIG. 20C. This latter state may correspond to a landed position.

Figure 21:
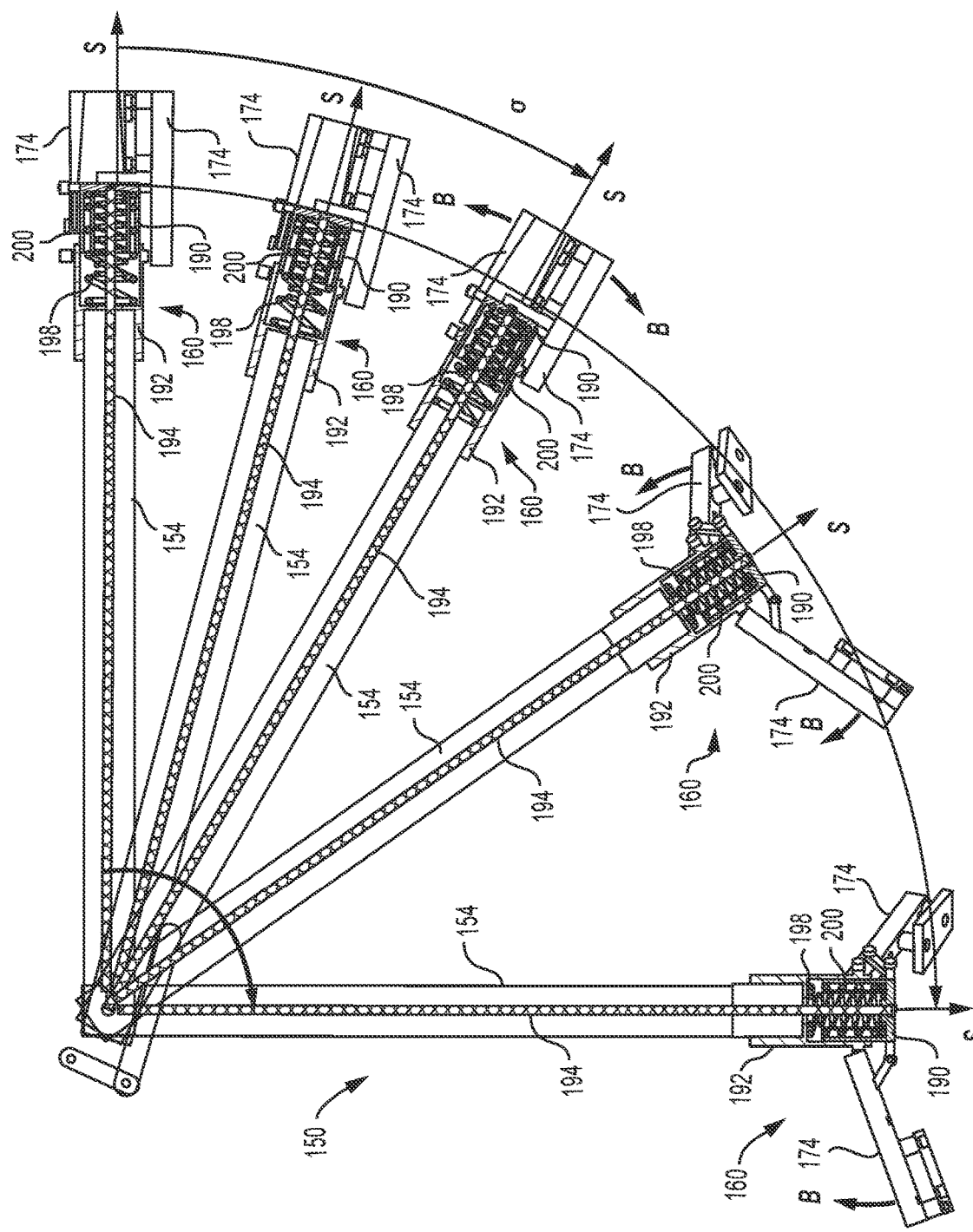
FIG. 21 is a partial side section view an example landing support assembly progressing from a stowed state to a deployed state and showing an example foot progressing from a retracted state to an at least partially splayed state according to a further aspect of the present disclosure.

FIG. 21 is a partial side section view an example landing support assembly 150 progressing from a stowed state to a deployed state, and showing an example foot 160 progressing from a retracted state to an at least partially splayed state according to a further aspect of the present disclosure. As shown in FIGS. 20A through 20C and 21, some embodiments also may include a deployment cable 194 (and/or a deployment actuator) coupled to the extender 190 and configured and/or positioned to cause the extender 190 to at least partially retract into the hollow end fixture 192. For example, the deployment cable 194 may be coupled to the extender 190 at an anchor point 196, pass through a hole 197 in the end fixture 192, pass through the interior of the strut 154 to the end of the strut 154 attached to the bracket 152 (see FIG. 14). In some embodiments, the end of the deployment cable 194 adjacent the bracket 152 may be anchored in such a way that when the strut 154 pivots from its stowed state toward its deployed state, the deployment cable 194 is pulled away from the extender 190 toward the bracket 152, thereby causing the extender 190 to retract into the end fixture 192, and thereby causing the lateral supports 174 to move from the retracted state (see, e.g., FIG. 20A) to the at least partially splayed state (see, e.g., FIG. 20B), and further, to the substantially fully splayed state (see, e.g., the lower portion of FIG. 20C).

In some embodiments, a pulley arrangement may be provided at the bracket 152 that may be configured to control the retraction and extension of the deployment cable 194 in a controlled manner according to the example manner described herein. In some embodiments, a deployment actuator may be provided in the strut 154 and/or at the bracket 152, and the deployment actuator (e.g., a motor and/or a spool) may be configured to control retraction and extension of the deployment cable 194 in the example manner described herein. In some embodiments, a linear actuator may be coupled to the strut 154 and the extender 190, and activation of the linear actuator may be configured to control retraction and extension of the extender 190. In some such embodiments, a controller (e.g., the systems controller 54 (FIGS. 1B and 2)) may be provided to control operation of the deployment actuator and/or the linear actuator.

As shown in FIG. 21, as the strut 154 pivots from the stowed state (the top of FIG. 21) through an arc toward the deployed state (the bottom of FIG. 21), the deployment cable 194 pulls the extender 190 into the end fixture 192, such that the lateral supports 174 pivot into the at least partially splayed state. In some embodiments, the deployment cable 194 has a length, and/or a pulley or actuator that controls retraction and/or extension of the deployment cable 194 is configured and/or operated, such that during activation of the strut actuator 156 to cause the strut 154 to extend (e.g., pivot) toward the deployed state, the strut 154 extends at least partially to the deployed state before the deployment cable 194 causes the extender 190 to at least partially retract into the end fixture 192 and at least partially extend the lateral supports 174 toward their at least partially splayed state. In some embodiments, the strut 154 may pivot from the stowed state toward the deployed state through an arc a ranging from about ten degrees to about sixty degrees before the lateral supports 174 begin to pivot outward. In some embodiments, the arc a may range from about fifteen degrees to about forty-five degrees, or from about fifteen degrees to about thirty degrees. Delaying initiation of pivoting of the lateral supports 174 may allow the foot 160 to clear other components of the aerial vehicle 10 when the strut 154 deploys, such as cowlings, cables, wiring harnesses, frame members, etc.

As shown in FIGS. 20A through 20C and 21, some embodiments may include one or more biasing members 198 engaged with the extender 190 and causing the extender 190 to at least partially extend from the hollow end fixture 192. In some embodiments, as shown, the deployment cable 194 may counteract one or more of the biasing member(s) 198, such that the extender 190 at least partially retracts into the hollow end fixture 192, for example, as outlined above with respect to causing the lateral supports 174 to pivot toward the at least partially splayed state. The biasing member(s) 198 may function to retain the lateral supports 174 in the stowed state (e.g., a substantially retracted state), unless the deployment cable 194 pulls the extender 190 to retract it into the hollow end fixture 192.

As shown in FIGS. 20A through 20C and 21, in some embodiments, the landing support assembly 150 also may include a shock absorbing member 200 engaged with the extender 190 and configured and/or positioned to reduce shock transmitted to the strut 154 as the extender 190 moves from the partially retracted positon to a more fully retracted position. For example, as shown in FIGS. 20A, 20B, and 20C, when the extender 190 is in the extended state (see, e.g., FIG. 20A) the biasing member 198 holds (or biases) the extender 190 in the extended state in order to maintain the lateral supports 174 in the stowed state. As the strut 154 is pivoted toward the deployed state, the deployment cable 194 counteracts the biasing member 198 to pull the extender 190 into the hollow end fixture 192 (see, e.g., FIG. 20B), compressing and shortening the biasing member 198. This condition may exist until, for example, the foot 160 of the landing support assembly 150 contacts the surface 176 on which the aerial vehicle 10 will be supported, and the weight of the aerial vehicle 10 begins to compress the shock absorbing member 200 (see, e.g., FIG. 20C). As the weight of the aerial vehicle 10 increases to compress and shorten the shock absorbing member 200, the shock absorbing member 200 provides a level of shock absorption transmitted to the strut 154 and to the aerial vehicle 10 as the aerial vehicle 10 begins to be fully supported by the landing support assemblies 150. The biasing member 198 and/or the shock absorbing member 200 may include one or more of a leaf spring, a coil spring, a torsion member, or a shock absorber. For example, the biasing member 198 and/or the shock absorbing member 200 may include a combination coil spring and shock absorber. In some embodiments, one or more components of the linkage 158 may include one or more of a leaf spring, a coil spring, a torsion member, or a shock absorber, for example, in order to provide a level of shock absorption transmitted to the strut 154 and to the aerial vehicle 10 as the aerial vehicle 10 begins to be fully supported by the landing support assemblies 150.

As shown in FIGS. 20A through 20C, in some embodiments, the biasing member 198 may include a coil spring having a first uncompressed length, a first diameter, and a first spring constant, and the shock absorbing member 200 may include a coil spring having a second uncompressed length, a second diameter, and a second spring constant. As shown, in some embodiments, the first diameter of the biasing member 198 and the second diameter of the shock absorbing member 200 may be selected, such that the shock absorbing member 200 nests inside the biasing member 198. In some embodiments, the second diameter of the shock absorbing member 200 and the first diameter of the biasing member 198 may be selected, such that the biasing member 198 nests inside the shock absorbing member 200.

As shown, in some embodiments, the first length of the biasing member 198 and the second length of the shock absorbing member 200 may be selected, such that the first length is longer than the second length, for example, so that the shock absorbing member 200 does not begin to compress until the biasing member 198 has compressed an amount sufficient to allow the lateral supports 174 to pivot toward (or to) the at least partially splayed state (see, e.g., FIG. 20B and the upper part of FIG. 20C). After the biasing member 198 has compressed a sufficient amount for the shock absorbing member 200 to begin to compress, the biasing member 198 and the shock absorbing member 200 will continue to compress, for example, until the weight of the aerial vehicle 10 forces the lateral supports 174 into the substantially fully splayed state (see, e.g., the lower part of FIG. 20C). In some embodiments, the second spring constant of the shock absorbing member 200 may be selected to be greater than the first spring constant of the biasing member 198, for example, to provide a sufficient resistance to compression to provide a shock absorbing function as the aerial vehicle 10 begins to be fully supported by the one or more landing support assemblies 150. In some embodiments, the second length of the shock absorbing member 200 and the first length of the biasing member 198 may be selected, such that the second length is longer than the first length, for example, so that the biasing member 198 does not begin to compress until the shock absorbing member 200 has compressed an amount sufficient to allow the lateral supports 174 to pivot toward (or to) the at least partially splayed state. In some embodiments, the first spring constant of the biasing member 198 may be selected to be greater than the second spring constant of the shock absorbing member 200, for example, to provide a sufficient resistance to compression to provide a shock absorbing function as the aerial vehicle 10 begins to be fully supported by the one or more landing support assemblies 150.

In some embodiments, as shown in FIGS. 20A through 20C, a sleeve 202 may be positioned between the biasing member 198 and the shock absorbing member 200, for example, in order to reduce the likelihood or prevent the biasing member 198 and the shock absorbing member 200 from interfering with one another during compression. For example, as shown, the sleeve 202 may extend from a base of the extender 190 toward the hollow end fixture 192. Some embodiments of the sleeve 202 may be relatively rigid and/or have a length that prevents the sleeve 202 from interfering with retraction of the extender 190 into the hollow end fixture 192, for example, as shown in FIGS. 20A through 20C. In some embodiments, the sleeve 202 may be flexible and have a length co-extensive with one or more of the biasing member 198 or the shock absorbing member 200 in the fully extended condition.

Figure 22A:
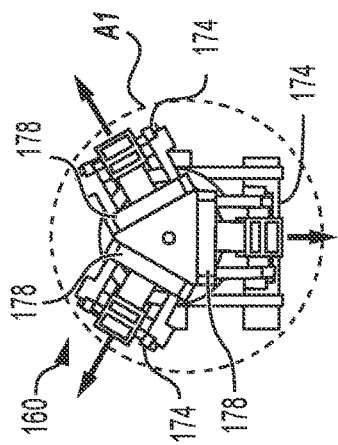
FIG. 22A is a bottom view of an example foot in a retracted state occupying a first example cross-sectional area according to a further aspect of the present disclosure.
Figure 22C:
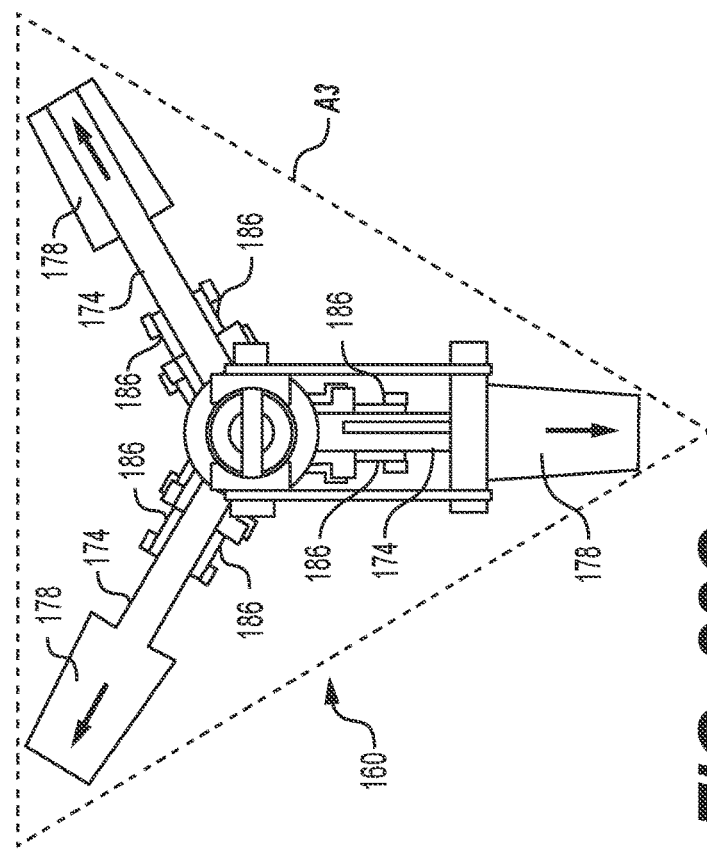
FIG. 22C is a top view of the example foot shown in FIG. 22A in a substantially fully splayed state occupying a third cross-sectional area according to a further aspect of the present disclosure.
Figure 22B:
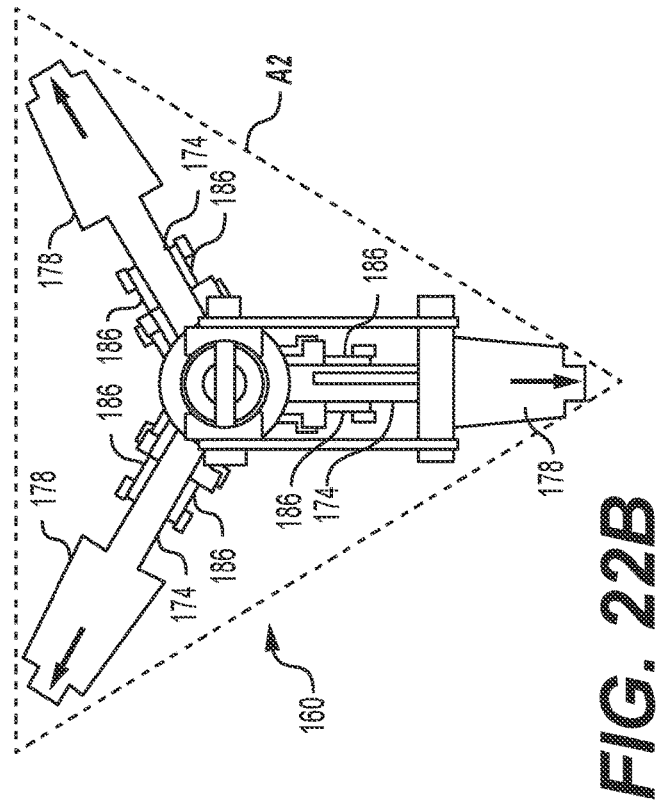
FIG. 22B is a top view of the example foot shown in FIG. 22A in an at least partially splayed state occupying a second example cross-sectional area according to a further aspect of the present disclosure.

FIG. 22A is a bottom view of an example foot 160 in a retracted state occupying a first example cross-sectional area A1, FIG. 22B is a top view of the example foot 160 shown in FIG. 22A in an at least partially splayed state occupying a second example cross-sectional area A2, and FIG. 22C is a top view of the example foot shown in FIG. 22A in a substantially fully splayed state occupying a third cross-sectional area A3. FIG. 22A, FIG. 22B, and FIG. 22C are not necessarily drawn to relative scale with respect to one another. As schematically illustrated in FIGS. 22A, 22B, and 22C, as the foot 160 transitions from its stowed state (FIG. 22A), to its at least partially splayed state (FIG. 22B), and further, to its substantially fully splayed state (FIG. 22C), the cross-sectional area occupied by the foot 160 increases from the first cross-sectional area A1, to the second cross-sectional area A2, and to the third cross-sectional area A3, respectively. This example increase in cross-sectional area occupied by the foot 160 shows that when in the stowed state, the foot 160 may be in a condition or form that occupies a relatively small volume, which may provide an ability to enhance the aerodynamics of the aerial vehicle 10 relative to assemblies that occupy a relatively larger volume, for example, if the foot 160 were in the at least partially splayed state or substantially fully splayed state. As shown in FIGS. 22B and 22C, the relatively increased second and third cross-sectional areas A2 and A3 may provide relatively enhanced stability to the landing support assemblies 150, for example, on soft terrain, such as dirt, gravel, sand, or snow.

Although for the purpose of this example, the first cross-sectional area A1 is depicted to approximate the area of a circle circumscribing the lateral supports 174 of the foot 160, other ways of defining the first cross-sectional area A1 are contemplated, such as, for example, the area of a triangle enclosing the lateral supports 174. Although for the purpose of this example, the second cross-sectional area A2 is depicted to approximate the area of a triangle enclosing the lateral supports 174 of the foot 160, other ways of defining the second cross-sectional area A2 are contemplated, such as, for example, the area of a circle circumscribing the lateral supports 174. Although for the purpose of this example, the third cross-sectional area A3 is depicted to approximate the area of a triangle enclosing the lateral supports 174 of the foot 160, other ways of defining the third cross-sectional area A3 are contemplated, such as, for example, the area of a circle circumscribing the lateral supports 174. Other ways of describing or characterizing the cross-sectional areas and cross-sectional shapes are contemplated.

Figure 23:
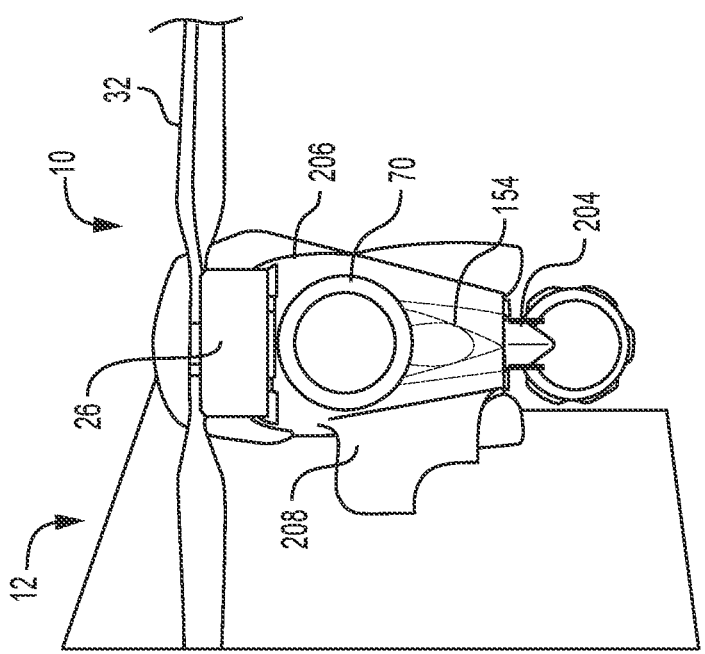
FIG. 23 is a partial end view of an example landing support assembly shown in a stowed state and including example cowlings coupled to the example landing support assembly and the aerial vehicle chassis according to a further aspect of the present disclosure.

FIG. 23 is a partial end view of an example landing support assembly 150 shown in a stowed state and including example cowlings coupled to the example landing support assembly 150 and the aerial vehicle chassis 12 according to a further aspect of the present disclosure. For example, as shown in FIG. 23, a cowling 204 may be coupled to the strut 154 and configured to aerodynamically cooperate with a portion of the aerial vehicle 10. As shown in FIG. 23, the aerial vehicle 10, in some embodiments, may include a motor cowling 206 coupled to the rotor beam 70 and configured to provide a more aerodynamic shape below the motor 26 and propulsion member 32, for example, such that the thrust provided by operation of the motor 26 and propulsion member 32 is relatively more effective than without the cowling 204 and/or the motor cowling 206. In some embodiments, the cowling 204 and/or the motor cowling 206 may form an airfoil (e.g., a substantially symmetrical airfoil). In some embodiments, the cowling 204 may be coupled to the strut 154 of the landing support assembly 154, such that as the strut 154 pivots between the stowed state (shown in FIG. 23) and the deployed state, the cowling 204 moves with the strut 154 (see e.g., FIGS. 12 and 13). In contrast, the motor cowling 206 is coupled to the rotor beam 70 (and/or another fixed portion of the chassis 12), and does not move with the strut 154. In some embodiments, a housing 208 may be provided to cover the strut actuator 156 (see FIG. 14) and aerodynamically enhance the flow of air around the strut actuator 156.

Figure 24:
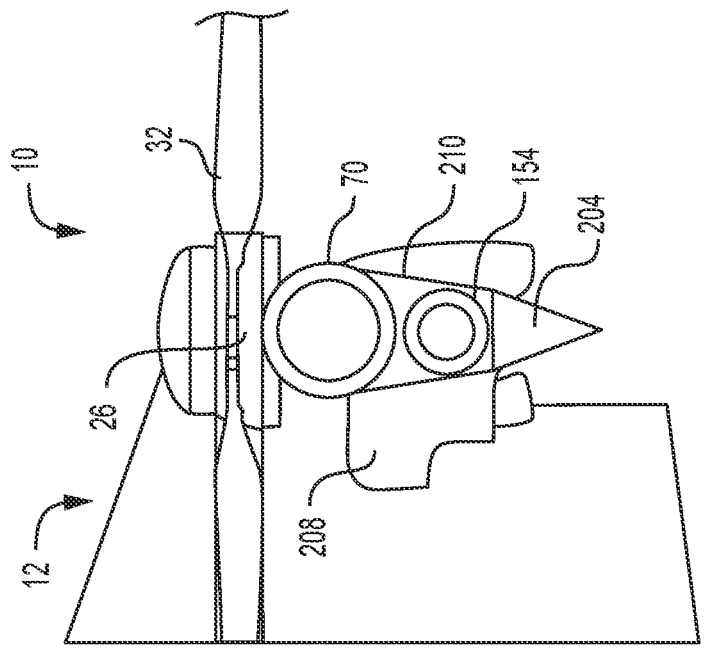
FIG. 24 is a partial end view of an example landing support assembly shown in a stowed state and including another example cowling coupled to the example landing support assembly according to a further aspect of the present disclosure.

FIG. 24 is a partial end view of an example landing support assembly 154 shown in a stowed state and including another example cowling 204 coupled to the example landing support assembly 154 according to a further aspect of the present disclosure. In the embodiment shown in FIG. 24, no motor cowling is provided, and thus, an upper surface of the rotor beam 70 serves as an aerodynamic surface. In some embodiments, the cowling 204 and/or the rotor beam 70 may form an airfoil (e.g., a substantially symmetrical airfoil). As shown in FIG. 24, a fixed cowling 210 may be coupled to the sides of the rotor beam 70 (and/or another fixed portion of the chassis 12) to assist with aerodynamics around the propulsion member 32 and the motor 26. Similar to the embodiment shown in FIG. 23, a housing 208 may be provided to cover the strut actuator 156 (see FIG. 14) and aerodynamically enhance the flow of air around the strut actuator 156.

In some embodiments, the end of the strut 154 remote from the bracket 152 may include a pivotable joint coupled to the strut 154 and the foot 160 and configured such that the foot 160 is pivotal relative to the strut 154 between a folded orientation during flight and an unfolded orientation when the aerial vehicle 10 is one of landing or supported on the surface 176. In some such embodiments, the pivotable joint may be configured to cause the foot 160 to pivot through an angle ranging from about forty-five degrees to about one-hundred degrees, for example, about ninety degrees, such that the lateral supports 174 extend downward when retracted, and the aerial vehicle 10 is hovering.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Additional Examples

An example landing support assembly configured to at least partially support an aerial vehicle on a surface may include a strut extendable to a deployed state for at least partially supporting the aerial vehicle on the surface and retractable to a stowed state during flight of the aerial vehicle; a bracket coupled to the strut, such that the strut is configured to pivot with respect to the bracket between the deployed state and the stowed state, the bracket configured to be coupled to a chassis of the aerial vehicle; a strut actuator coupled to the strut via a linkage and configured to cause the strut to pivot relative to the bracket between the deployed state and the stowed state; and a foot coupled to an end of the strut remote from the bracket, the foot configured to change between a retracted state during flight having a first cross-sectional area and an at least partially splayed state for at least partially supporting the aerial vehicle and having a second cross-sectional area greater than the first cross-sectional area.

The example landing support assembly above, wherein the bracket defines a pivot axis about which the strut pivots, the strut coupled to the bracket via a pivot pin at the pivot axis.

Any one of the example landing support assemblies above, wherein the bracket includes opposing bracket plates, each of the opposing bracket plates defining opposing holes receiving the pivot pin.

Any one of the example landing support assemblies above, wherein the linkage includes a crank link coupled to the strut actuator and a rocker link pivotally coupled to the crank link and pivotally coupled to the strut at an attachment point intermediate the bracket and the foot, wherein the strut actuator is configured to rotate the crank link, thereby causing the rocker link to extend the strut to the deployed state and retract the strut the stowed state.

Any one of the example landing support assemblies above, wherein the strut actuator includes one or more of a motor or a linear actuator.

Any one of the example landing support assemblies above, wherein the foot includes a plurality of lateral supports configured to pivot relative to the strut between the retracted state during flight and the at least partially splayed state for at least partially supporting the aerial vehicle on a surface.

Any one of the example landing support assemblies above, further including a support pad coupled to an underside of each of the lateral supports and configured to provide at least one of a cushion between the underside of the lateral supports and the surface or traction between the lateral supports and the surface.

Any one of the example landing support assemblies above, further including a support isolator coupled to each of the support pads and the underside of each of the lateral supports and configured to provide shock absorption between the support pads and the underside of the lateral supports.

Any one of the example landing support assemblies above, wherein each of the plurality of lateral supports include: an attachment end coupled to the strut; an intermediate portion coupled to a deployment link; and a support end opposite the attachment end.

Any one of the example landing support assemblies above, wherein: the foot further includes an extender coupled to the strut at the end of the strut remote from the bracket and configured to reciprocate relative to the end of the strut; the extender is coupled to a first end of each of the deployment links; and a second end of each of the deployment links is coupled to an intermediate portion of a respective lateral support, such that reciprocation of the extender causes the lateral supports to pivot relative to the strut between the retracted state and the at least partially splayed state.

Any one of the example landing support assemblies above, further including a hollow end fixture, wherein the extender is at least partially received in the hollow end fixture, such that when the extender extends relative the hollow end fixture, the lateral supports at least partially retract via the deployment links, and when the extender retracts relative to the hollow end fixture, the lateral supports at least partially extend via the deployment links.

Any one of the example landing support assemblies above, further including at least one of a deployment cable or a deployment actuator coupled to the extender and configured to cause the extender to at least partially retract into the hollow end fixture.

Any one of the example landing support assemblies above, further including a biasing member engaged with the extender and causing the extender to at least partially extend from the hollow end fixture.

Any one of the example landing support assemblies above, wherein the landing support assembly includes a deployment cable coupled to the extender and the strut actuator, such that during activation of the strut actuator to cause the strut to extend to the deployed state, the deployment cable causes the extender to at least partially retract into the hollow end fixture and at least partially extend the lateral supports.

Any one of the example landing support assemblies above, further including a biasing member engaged with the extender and causing the extender to at least partially extend from the hollow end fixture, wherein the deployment cable counteracts the biasing member, such that the extender at least partially retracts into the hollow end fixture.

Any one of the example landing support assemblies above, wherein the deployment cable has a length, such that during activation of the strut actuator to cause the strut to extend toward the deployed state, the strut extends at least partially to the deployed state before the deployment cable causes the extender to at least partially retract into the hollow end fixture and at least partially extend the lateral supports.

Any one of the example landing support assemblies above, wherein the landing support assembly includes a deployment actuator coupled to the extender, such that during activation of the strut actuator to cause the strut to extend toward the deployed state, the deployment actuator causes the extender to at least partially retract into the hollow end fixture and at least partially extend the lateral supports.

Any one of the example landing support assemblies above, wherein the deployment actuator is configured such that the strut extends at least partially to the deployed state before the deployment actuator causes the extender to retract at least partially into the hollow end fixture and at least partially extend the lateral supports.

Any one of the example landing support assemblies above, further including a shock absorbing member engaged with the extender, the extender configured to move from an extended position causing the lateral supports to be in the retracted state, to a partially retracted position causing the lateral supports to be in a partially splayed state, to a more fully retracted position causing the lateral supports to be in a substantially fully splayed state, wherein the shock absorbing member is configured to reduce shock transmitted to the strut as the extender moves from the partially retracted positon to the more fully retracted position.

Any one of the example landing support assemblies above, wherein the shock absorbing member includes at least one of a leaf spring, a coil spring, a torsion member, or a shock absorber.

Any one of the example landing support assemblies above, further including a cowling coupled to the strut and configured to aerodynamically cooperate with a portion of the aerial vehicle.

Any one of the example landing support assemblies above, wherein the end of the strut remote from the bracket includes a pivotable joint coupled to the strut and the foot and configured such that the foot is pivotal relative to the strut between a folded orientation during flight and an unfolded orientation when the aerial vehicle is one of landing or supported on the surface.

An example aerial vehicle may include: a chassis; and a plurality of landing support assemblies coupled to the chassis, the plurality of landing support assemblies being configured to support the aerial vehicle on a surface, at least one of the landing support assemblies including: a strut extendable to a deployed state for at least partially supporting the aerial vehicle on the surface and retractable to a stowed state during flight of the aerial vehicle; a bracket coupled to the strut and the chassis, such that the strut is configured to pivot with respect to the bracket between the deployed state and the stowed state; a strut actuator coupled to the strut via a linkage and configured to cause the strut to pivot relative to the bracket between the deployed state and the stowed state; and a foot coupled to an end of the strut remote from the bracket, the foot configured to change between a retracted state, during flight, having a first cross-sectional area, and an at least partially splayed state for at least partially supporting aerial vehicle and having a second cross-sectional area greater than the first cross-sectional area.

The example aerial vehicle above, wherein the strut has a longitudinal strut axis and the chassis includes a frame member having a longitudinal frame member axis, and wherein, when the strut is in the stowed state, the longitudinal strut axis and the longitudinal frame member axis are substantially parallel.

Any one of the example aerial vehicles above, wherein the strut has a longitudinal strut axis and the chassis includes a frame member having a longitudinal frame member axis, and wherein, when the strut is in the deployed state, the longitudinal strut axis and the longitudinal frame member axis are transverse to one another (e.g., substantially perpendicular).

Any one of the example aerial vehicles above, further including a propulsion member coupled to the chassis and configured to provide thrust for movement of the aerial vehicle, wherein the bracket is coupled to the chassis adjacent the propulsion member (e.g., under the propulsion member).

Any one of the example aerial vehicles above, further including a plurality of propulsion members coupled to the chassis and configured to provide thrust for movement of the aerial vehicle, wherein one of the plurality of landing support assemblies is coupled to the chassis adjacent to each of at least two of the plurality of propulsions members (e.g., under the propulsion members).

Any one of the example aerial vehicles above, wherein the at least one landing support assembly further includes a cowling coupled to the strut and configured to aerodynamically cooperate with a portion of the chassis of the aerial vehicle when the strut is in the stowed state.

Any one of the example aerial vehicles above, wherein the chassis includes a frame member to which bracket is attached, and the cowling is configured to aerodynamically cooperate with the frame member when the strut is in the stowed state.

Any one of the example aerial vehicles above, further including a shroud coupled to the chassis, wherein the cowling is configured to aerodynamically cooperate with the shroud when the strut is in the stowed state.

Any one of the example aerial vehicles above, wherein the bracket defines a pivot axis about which the strut pivots, the strut coupled to the bracket via a pivot pin at the pivot axis.

Any one of the example aerial vehicles above, wherein the bracket includes opposing bracket plates, each of the bracket plates defining opposing holes receiving the pivot pin.

Any one of the example aerial vehicles above, wherein the linkage includes a crank link coupled to the strut actuator and a rocker link pivotally coupled to the crank link and pivotally coupled to the strut at an attachment point intermediate the bracket and the foot, wherein the strut actuator is configured to rotate the crank link, thereby causing the rocker link to extend the strut to the deployed state and retract the strut the stowed state.

Any one of the example aerial vehicles above, wherein the strut actuator includes one or more of a motor or a linear actuator.

Any one of the example aerial vehicles above, wherein the foot includes a plurality of lateral supports configured to pivot relative to the strut between a retracted state during flight and an at least partially splayed state for at least partially supporting the aerial vehicle on a surface.

Any one of the example aerial vehicles above, further including a support pad coupled to an underside of each of the lateral supports and configured to provide at least one of a cushion between the underside of the lateral supports and the surface or traction between the lateral supports and the surface.

Any one of the example aerial vehicles above, further including a support isolator coupled to each of the support pads and the underside of each of the lateral supports, and configured to provide shock absorption between the support pads and the underside of the lateral supports.

Any one of the example aerial vehicles above, wherein each of the plurality of lateral supports includes: an attachment end coupled to the strut; an intermediate portion coupled to a deployment link; and a support end opposite the attachment end.

Any one of the example aerial vehicles above, wherein: the foot further includes an extender coupled to the strut at the end of the strut remote from the bracket and configured to reciprocate relative to the end of the strut; the extender is coupled to a first end of each of the deployment links; and a second end of each of the deployment links is coupled to an intermediate portion of a respective lateral support, such that reciprocation of the extender causes the lateral supports to pivot relative to the strut between the retracted state and the at least partially splayed state.

Any one of the example aerial vehicles above, wherein the strut further includes a hollow end fixture, and the extender is at least partially received in the hollow end fixture, such that when the extender extends relative the hollow end fixture, the lateral supports at least partially retract via the deployment links, and when the extender retracts relative to the hollow end fixture, the lateral supports at least partially extend via the deployment links.

Any one of the example aerial vehicles above, further including at least one of a deployment cable or a deployment actuator coupled to the extender and configured to cause the extender to retract at least partially into the hollow end fixture.

Any one of the example aerial vehicles above, further including a biasing member engaged with the extender and causing the extender to at least partially extend from the hollow end fixture.

Any one of the example aerial vehicles above, wherein the landing support assembly includes a deployment cable coupled to the extender and the strut actuator, such that during activation of the strut actuator to cause the strut to extend toward the deployed state, the deployment cable causes the extender to retract at least partially into the hollow end fixture and at least partially extend the lateral supports.

Any one of the example aerial vehicles above, further including a biasing member engaged with the extender and configured to cause the extender to at least partially extend from the hollow end fixture, wherein the deployment cable counteracts the biasing member, such that the extender retracts at least partially into the hollow end fixture.

Any one of the example aerial vehicles above, wherein the deployment cable has a length, such that during activation of the strut actuator to cause the strut to extend toward the deployed state, the strut extends at least partially to the deployed state before the deployment cable causes the extender to retract at least partially into the hollow end fixture and at least partially extend the lateral supports.

Any one of the example aerial vehicles above, wherein the landing support assembly includes a deployment actuator coupled to the extender, such that during activation of the strut actuator to cause the strut to extend toward the deployed state, the deployment actuator causes the extender to retract at least partially into the hollow end fixture and at least partially extend the lateral supports.

Any one of the example aerial vehicles above, wherein the deployment actuator is configured such that the strut extends at least partially toward the deployed state before the deployment actuator causes the extender to retract at least partially into the hollow end fixture and at least partially extend the lateral supports.

Any one of the example aerial vehicles above, further including a shock absorbing member engaged with the extender, the extender configured to move from an at least partially extended position causing the lateral supports to be in the retracted state, to a partially retracted position causing the lateral supports to be in a partially splayed state, to a more fully retracted position causing the lateral supports to be in a substantially fully splayed state, wherein the shock absorbing member is configured to reduce shock transmitted to the strut as the extender moves from the partially retracted positon to the more fully retracted position.

Any one of the example aerial vehicles above, wherein the shock absorbing member includes at least one of a leaf spring, a coil spring, or a shock absorber.

Any one of the example aerial vehicles above, further including a cowling coupled to the strut and configured to aerodynamically cooperate with a portion of the aerial vehicle.

Any one of the example aerial vehicles above, wherein the end of the strut remote from the bracket includes a pivotable joint coupled to the strut and the foot and configured such that the foot is pivotable relative to the strut between a folded orientation during flight and an unfolded orientation when the aerial vehicle is one of landing or supported on the surface.

An example method for operating one or more landing support assemblies of an aerial vehicle having any one of the configurations described above.

The foregoing description generally illustrates and describes various embodiments of the present disclosure. It will, however, be understood by those skilled in the art that various changes and modifications can be made to the above-discussed construction of the present disclosure without departing from the spirit and scope of the embodiments as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present disclosure as set forth in the appended claims.

What is claimed is:

1. A landing support assembly configured to at least partially support an aerial vehicle on a surface, the landing support assembly comprising:
    a strut extendable to a deployed state for at least partially supporting the aerial vehicle on the surface and retractable to a stowed state during flight of the aerial vehicle;
    a bracket coupled to the strut, such that the strut is configured to pivot with respect to the bracket between the deployed state and the stowed state, the bracket configured to be coupled to a chassis of the aerial vehicle;
    a strut actuator coupled to the strut via a linkage and configured to cause the strut to pivot relative to the bracket between the deployed state and the stowed state;
    a foot coupled to an end of the strut remote from the bracket, the foot configured to change between a retracted state during flight having a first cross-sectional area and an at least partially splayed state for at least partially supporting the aerial vehicle and having a second cross-sectional area greater than the first cross-sectional area, wherein
    the foot further comprises a plurality of lateral supports, a plurality of deployment links, and an extender, the extender being coupled to the strut at the end of the strut remote from the bracket and configured to reciprocate relative to the end of the strut;
    the extender is coupled to a first end of each deployment link of the plurality of deployment links; and a second end of each of the deployment links is coupled to an intermediate portion of a respective lateral support of the plurality of lateral supports, such that reciprocation of the extender causes the lateral supports to pivot relative to the strut between the retracted state and the at least partially splayed state; and a shock absorbing member engaged with the extender, the extender configured to move from an extended position causing the lateral supports to be in the retracted state, to a partially retracted position causing the lateral supports to be in a partially splayed state, to a more fully retracted position causing the lateral supports to be in a substantially fully splayed state, wherein the shock absorbing member is configured to reduce shock transmitted to the strut as the extender moves from the partially retracted position to the more fully retracted position.

2. The landing support assembly of claim 1, wherein the bracket defines a pivot axis about which the strut pivots, the strut coupled to the bracket via a pivot pin at the pivot axis, and wherein the bracket comprises opposing bracket plates, each of the opposing bracket plates defining opposing holes receiving the pivot pin.

3. The landing support assembly of claim 1, wherein the linkage comprises:
a crank link coupled to the strut actuator; and
a rocker link pivotally coupled to the crank link and pivotally coupled to the strut at an attachment point intermediate the bracket and the foot,
wherein the strut actuator is configured to rotate the crank link, thereby causing the rocker link to extend the strut to the deployed state and retract the strut the stowed state.

4. The landing support assembly of claim 1, wherein the strut actuator comprises one or more of a motor or a linear actuator.

5. The landing support assembly of claim 1, further comprising a hollow end fixture, wherein the extender is at least partially received in the hollow end fixture, such that when the extender extends relative the hollow end fixture, the lateral supports at least partially retract via the deployment links, and when the extender retracts relative to the hollow end fixture, the lateral supports at least partially extend via the deployment links.

6. The landing support assembly of claim 1, wherein the shock absorbing member comprises at least one of a leaf spring, a coil spring, a torsion member, or a shock absorber.

7. The landing support assembly of claim 1, further comprising a cowling coupled to the strut and configured to aerodynamically cooperate with a portion of the aerial vehicle.

8. The landing support assembly of claim 1, wherein the end of the strut remote from the bracket comprises a pivotable joint coupled to the strut and the foot and configured such that the foot is pivotal relative to the strut between a folded orientation during flight and an unfolded orientation when the aerial vehicle is one of landing or supported on the surface.

9. The landing support assembly of claim 1, further comprising at least one of a deployment cable or a deployment actuator coupled to the extender and configured to cause the extender to at least partially retract into the hollow end fixture.

10. The landing support assembly of claim 9, further comprising a biasing member engaged with the extender and causing the extender to at least partially extend from the hollow end fixture.

11. The landing support assembly of claim 9, wherein the landing support assembly comprises a deployment actuator coupled to the extender, such that during activation of the strut actuator to cause the strut to extend toward the deployed state, the deployment actuator causes the extender to at least partially retract into the hollow end fixture and at least partially extend the lateral supports.

12. The landing support assembly of claim 11, wherein the deployment actuator is configured such that the strut extends at least partially to the deployed state before the deployment actuator causes the extender to retract at least partially into the hollow end fixture and at least partially extend the lateral supports.

13. The landing support assembly of claim 1, wherein the lateral supports are configured to pivot relative to the strut between the retracted state during flight and the at least partially splayed state for at least partially supporting the aerial vehicle on a surface.

14. The landing support assembly of claim 13, wherein each of the plurality of lateral supports comprises:
an attachment end coupled to the strut;
an intermediate portion coupled to a respective deployment link of the plurality of deployment links; and
a support end opposite the attachment end.

15. The landing support assembly of claim 13, further comprising a support pad coupled to an underside of each of the lateral supports and configured to provide at least one of a cushion between the underside of the lateral supports and the surface or traction between the lateral supports and the surface.

16. The landing support assembly of claim 15, further comprising a support isolator coupled to each of the support pads and the underside of each of the lateral supports and configured to provide shock absorption between the support pads and the underside of the lateral supports.

17. A landing support assembly configured to at least partially support an aerial vehicle on a surface, the landing support assembly comprising:
a strut extendable to a deployed state for at least partially supporting the aerial vehicle on the surface and retractable to a stowed state during flight of the aerial vehicle;
a bracket coupled to the strut, such that the strut is configured to pivot with respect to the bracket between the deployed state and the stowed state, the bracket configured to be coupled to a chassis of the aerial vehicle;
a strut actuator coupled to the strut via a linkage and configured to cause the strut to pivot relative to the bracket between the deployed state and the stowed state;
a foot coupled to an end of the strut remote from the bracket, the foot configured to change between a retracted state during flight having a first cross-sectional area and an at least partially splayed state for at least partially supporting the aerial vehicle and having a second cross-sectional area greater than the first cross-sectional area, wherein:
the foot further comprises a plurality of lateral supports, a plurality of deployment links, and an extender, the extender being coupled to the strut at the end of the strut remote from the bracket and configured to reciprocate relative to the end of the strut;

the extender is coupled to a first end of each deployment link of the plurality of deployment links; and a second end of each of the deployment links is coupled to an intermediate portion of a respective lateral support of the plurality of lateral supports, such that reciprocation of the extender causes the lateral supports to pivot relative to the strut between the retracted state and the at least partially splayed state; and wherein the landing support assembly comprises a deployment cable coupled to the extender and the strut actuator, such that during activation of the strut actuator to cause the strut to extend to the deployed state, the deployment cable causes the extender to at least partially retract into the hollow end fixture and at least partially extend the lateral supports.

18. The landing support assembly of claim 17, further comprising a biasing member engaged with the extender and causing the extender to at least partially extend from the hollow end fixture, wherein the deployment cable counteracts the biasing member, such that the extender at least partially retracts into the hollow end fixture.

19. The landing support assembly of claim 18, wherein the deployment cable has a length, such that during activation of the strut actuator to cause the strut to extend toward the deployed state, the strut extends at least partially to the deployed state before the deployment cable causes the extender to at least partially retract into the hollow end fixture and at least partially extend the lateral supports.

* * * * *